(12) United States Patent
Toriyama

(10) Patent No.: US 9,990,354 B2
(45) Date of Patent: Jun. 5, 2018

(54) INFORMATION DISPLAYING APPARATUS, METHOD OF DISPLAYING INFORMATION, INFORMATION DISPLAYING SYSTEM, AND SERVER APPARATUS AND TERMINAL DEVICE

(71) Applicant: CASIO COMPUTER CO., LTD., Shibuya-ku, Tokyo (JP)

(72) Inventor: Koji Toriyama, Mizuho-machi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 946 days.

(21) Appl. No.: 14/168,921

(22) Filed: Jan. 30, 2014

(65) Prior Publication Data

US 2014/0210759 A1    Jul. 31, 2014

(30) Foreign Application Priority Data

Jan. 31, 2013    (JP) ................... 2013-016948

(51) Int. Cl.
| | |
|---|---|
| G06F 3/0488 | (2013.01) |
| G06F 17/27 | (2006.01) |
| G06F 3/0484 | (2013.01) |

(52) U.S. Cl.
CPC ........ G06F 17/2735 (2013.01); G06F 3/0484 (2013.01); G06F 3/04883 (2013.01); *G06F 2203/04806* (2013.01)

(58) Field of Classification Search
CPC ..... G06F 3/0488; G06F 3/04883; G06F 3/044
See application file for complete search history.

(56) References Cited

U.S. PATENT DOCUMENTS

| | | | |
|---|---|---|---|
| 2009/0237372 A1* | 9/2009 | Kim .................. | G06F 3/044 345/173 |
| 2010/0026640 A1* | 2/2010 | Kim .................. | G06F 3/0414 345/173 |

(Continued)

FOREIGN PATENT DOCUMENTS

| | | |
|---|---|---|
| JP | 11-031145 A | 2/1999 |
| JP | 2008217052 A | 9/2008 |

(Continued)

OTHER PUBLICATIONS

Japanese Office Action (and English translation thereof) dated Feb. 9, 2016, issued in counterpart Japanese Application No. 2013-016948.

*Primary Examiner* — Alexander Eisen
*Assistant Examiner* — Mansour M Said
(74) *Attorney, Agent, or Firm* — Holtz, Holtz & Volek PC

(57) ABSTRACT

An information displaying apparatus having a touch-panel display unit is provided. An information obtaining unit obtains explanation information of a direction word specified by user, and displays the obtained explanation information of the direction word on the touch-panel displaying unit. When the user touches on the touch-panel display unit, a multi-touch detecting unit detects touch positions on the touch-panel display unit. A shift judging unit judges whether a distance between the detected touch positions has increased or decreased, when the user shifts the touch positions on the touch-panel display unit. A display-information controlling unit displays detailed explanation information of the direction word, when the shift judging unit determines that the distance between the touch positions has increased, and displays simplified explanation information of the direction word, when the shift judging unit determines that the distance between the touch positions has decreased.

9 Claims, 17 Drawing Sheets

(56) References Cited

U.S. PATENT DOCUMENTS

| | | | |
|---|---|---|---|
| 2010/0088641 A1 | 4/2010 | Choi | |
| 2010/0283743 A1 | 11/2010 | Coddington | |
| 2011/0025718 A1* | 2/2011 | Takarabe | G06F 3/04886 345/661 |
| 2011/0055263 A1* | 3/2011 | Chiu | G06F 17/30545 707/770 |
| 2012/0084647 A1* | 4/2012 | Homma | G06F 3/0483 715/273 |
| 2012/0327003 A1* | 12/2012 | Matsumura | G06F 3/04883 345/173 |
| 2013/0113720 A1* | 5/2013 | Van Eerd | G06F 3/04883 345/173 |
| 2013/0265246 A1* | 10/2013 | Tae | G06F 3/041 345/173 |
| 2015/0205495 A1* | 7/2015 | Koide | G06F 3/0488 715/760 |

FOREIGN PATENT DOCUMENTS

| | | |
|---|---|---|
| JP | 2008-299474 A | 12/2008 |
| JP | 2012504837 A | 2/2012 |
| JP | 2012121179 A | 6/2012 |
| JP | 2013-008201 A | 1/2013 |
| WO | 2010041826 A3 | 6/2010 |
| WO | 2011118096 A1 | 9/2011 |
| WO | 2013009092 A2 | 1/2013 |

\* cited by examiner

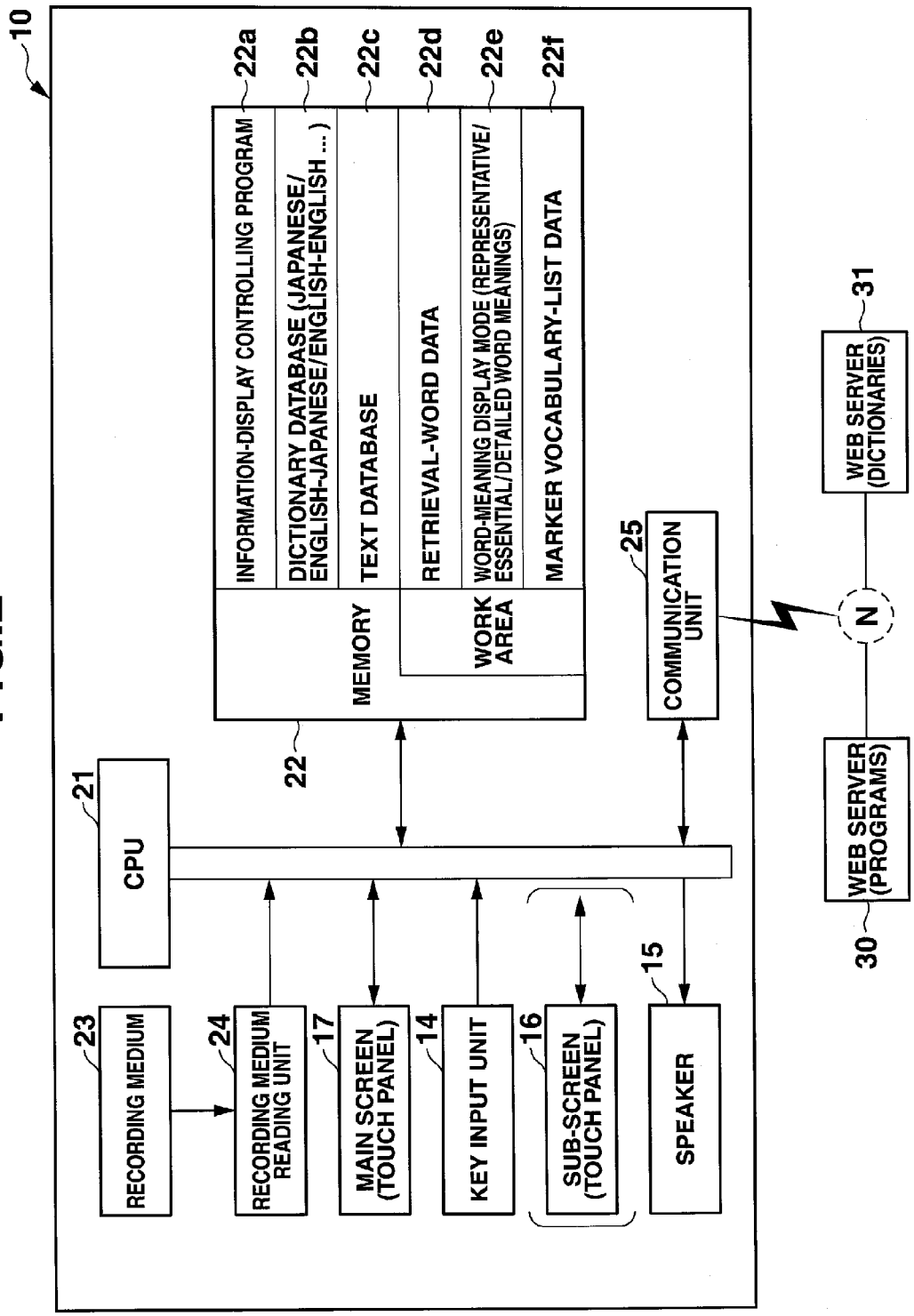

FIG.3

[ENGLISH-JAPANESE DICTIONARY]

life [láif]
—n. (pl. lives [láivz])
1
(1)(一般に)生命, 生命現象：[用例]
(2)(個人・個体の)命, 生命；生存；寿命：[用例]
(3)(命をもつものとしての)人, 人命；[用例]
(4)《集合的》生き物, 生物, 生命体：[用例]
2 人生, 実生活；世間, 世の中：[用例]
3 (生涯の)一時期；《one's life》全人生, 生涯：[用例]
4 (機械, 道路などの)耐用期間, 寿命；(賃貸契約などの)有効期間, (包装食品などの)賞味[品質保持]期限, (薬品などの)有効期限
[物理]素粒子などの)寿命(cf. HALF—LIFE)：[用例]
5
(1)《修飾語を伴って》(ある特徴を持った)生活；(社会での)暮らし方, …生活：[用例]
(2)生計(の手段)：[用例]
(3)《the life, the L—》《米俗》(売春・同性愛などに社会的にささげられた)その種の生活, その道, その世界：[用例]
6 [伝記, 一代記, 言行録：[用例]
7 生気, 活気, 活発さ：[用例]
8 (物事の)生命となるもの, 精髄：[用例]
9 《the life》《話》…を華やかにする人[もの], (…の)中心人物, 花形《of ...》：[用例]
10 (弾力, 弾性；伸縮性：[用例]
11 · · · ·
12 · · · ·
13 · · · ·
14 · · · ·
15 · · · ·
16 · · · ·
17 · · · ·
18 · · · ·
19 · · · ·
20 · · · ·
—adj.
1《限定的》一生の, 生涯の, 終身の(▶通常 life time を用いる)：[用例]
2《限定的》 · · · ·
3《限定的》 · · · ·
4《限定的》 · · · ·

THUMB OF LEFT HAND HELD AT LINE (2), AND THUMB OF RIGHT HAND IS MOVED DOWNWARD

ALL ESSENTIAL WORDS (2) TO (5) ARE DISPLAYED

INFORMATION DISPLAYING APPARATUS, METHOD OF DISPLAYING INFORMATION, INFORMATION DISPLAYING SYSTEM, AND SERVER APPARATUS AND TERMINAL DEVICE

CROSS-REFERENCE TO RELATED APPLICATION

The present application is based upon and claims the benefit of priority from the prior Japanese Patent Application No. 2013-016948, filed Jan. 31, 2013, the entire contents of which are incorporated herein by reference.

BACKGROUND OF THE INVENTION

1. Field of the Invention

The present invention relates to an information displaying apparatus, a method of displaying information, an information displaying system, and a server apparatus and terminal device, which display information retrieved from a dictionary.

2. Description of the Related Art

A display controlling apparatus is disclosed, for example, by Japanese Unexamined Patent Publication No. 2008-299474. This display controlling apparatus has an index screen, on which plural pictures taken with a digital camera are arranged in a matrix and displayed. When a user touches (multi-touch) the index screen with his/her two fingers and pinches out or pinches in, then the pictures displayed on the index screen are enlarged or reduced in size on the index screen.

The display controlling apparatus can display a list of more pictures on the index screen or display a particular picture enlarged at the center of the index screen, in response to the user's simple operation on the index screen.

When browsing information contained in pages of magazines and/or news papers, on which headlines and articles and/or drawings and pictures are properly laid out in different sizes and character sizes, by use of a compact-size electronic device, the above display controlling apparatus can be used conveniently for reading the headline written in large characters from the page reduced in size and/or for reading the article from the enlarged vicinity of the particular headline.

Meanwhile, in dictionary information documented in electronic dictionaries, all the explanation information (containing synonyms for each of plural word meanings including essential words and the additional explanations) of each direction word is written in the characters of the same size as a general rule.

Therefore, different from reading the news papers and/or magazines, in which the headlines and articles are properly laid out and written in different character sizes, it is not appropriate to use the above display controlling apparatus for browsing the dictionary information enlarged or reduced in size.

When using the conventional compact-size electronic device for browsing the dictionary information, users are required to arrange and display in order the leading word meanings contained in the explanation information of a direction word and to scroll the arranged word meanings for browsing, or to switch to display examples or explanations of a particular word. As described, it is hard for various users to browse necessary information in a simple manner by use of the conventional electronic device.

The present invention has been made in consideration of the inconvenience involved in the conventional electronic devices, and provide an information displaying apparatus, a method of displaying information, an information displaying system, and the server apparatus, and terminal device, which provide the users with a necessary amount of dictionary information and allow them to easily browse such information.

SUMMARY OF THE INVENTION

According to one aspect of the invention, there is provided an information displaying apparatus which comprises a display unit which includes a touch-panel, an obtaining unit which obtains explanation information of a direction word specified by user's operations, an explanation display controlling unit which displays the explanation information obtained by the obtaining unit on the touch-panel displaying unit, a multi-touch detecting unit which detects touch positions on the touch-panel display unit touched by user's operations, a shift judging unit which judges whether a distance between the touch positions detected by the multi-touch detecting unit is increased or decreased when the touch positions are shifted on the touch-panel display unit, and a display-information controlling unit which displays on the touch-panel display unit detailed explanation information of the direction word obtained by the obtaining unit, when the shift judging unit judges that the distance between the touch positions is increased, and displays simplified explanation information of the direction word, when the shift judging unit judges that the distance between the touch positions is decreased.

According to another aspect of the invention, there is provided a dictionary-information displaying system comprising a server apparatus having a communication function through a network, and a terminal device, wherein the server apparatus comprises a dictionary storing unit which stores dictionary data containing direction words and explanation information associated with the direction words, a retrieval-word receiving unit which receives from the terminal device a retrieval word entered in response to user's operation, an explanation-information sending unit which reads from the dictionary data a direction word corresponding to the retrieval word received by the retrieval-word receiving unit and explanation information of the direction word, and sends the terminal device the direction word and the explanation information of the direction word, a touch-position receiving unit which receives detected touch positions where a user operates on a touch-panel displaying unit of the terminal device, a multi-touch detecting unit which detects multi-touch operation by the user based on the touch-positions received by the touch-position receiving unit, a shift judging unit which judges whether touch positions of the multi-touch operation of the user detected by the multi-touch detecting unit is increased or decreased when the touch positions are shifted on the touch-panel display unit, and a sending-information controlling unit which sends the terminal device the explanation information as detailed information or as simplified information, depending on the judgment made by the shift judging unit, wherein said explanation information is read from the dictionary data by the explanation-information sending unit, and the terminal device comprises a touch-panel displaying unit which displays data, a retrieval-word sending unit which sends a retrieval word entered in response to user's operation to the server apparatus, an explanation-information display controlling unit which receives the direction word and the explanation information of the direction word sent from the explanation-information sending unit of the server apparatus in response to sending of the retrieval word by the retrieval-word sending unit and displays the received direction word and explanation information of the direction word on the touch-panel display unit, a touch-position sending unit which sends the server apparatus detected touch positions on the touch-panel display unit where the user operates, and a display-information controlling unit which receives the detailed or simplified explanation information sent from the sending-information controlling unit of the server apparatus in response to sending of the touch positions by the touch-position sending unit, and displays the explanation information displayed on the touch-panel display unit by the explanation-information display controlling unit as detailed information or simplified information.

BRIEF DESCRIPTION OF THE DRAWINGS

FIG. 2 is a block diagram of a circuit configuration of an electronic circuit of the electronic dictionary apparatus according to the embodiment of the invention.

FIG. 3 is a view showing a specific example of explanation information of a direction word "life" in [English-Japanese dictionary] stored in a dictionary database of the electronic dictionary apparatus.

DETAILED DESCRIPTION OF THE PREFERRED EMBODIMENTS

The preferred embodiments of the invention will be described with reference to the accompanying drawings in detail.

Figure 1:
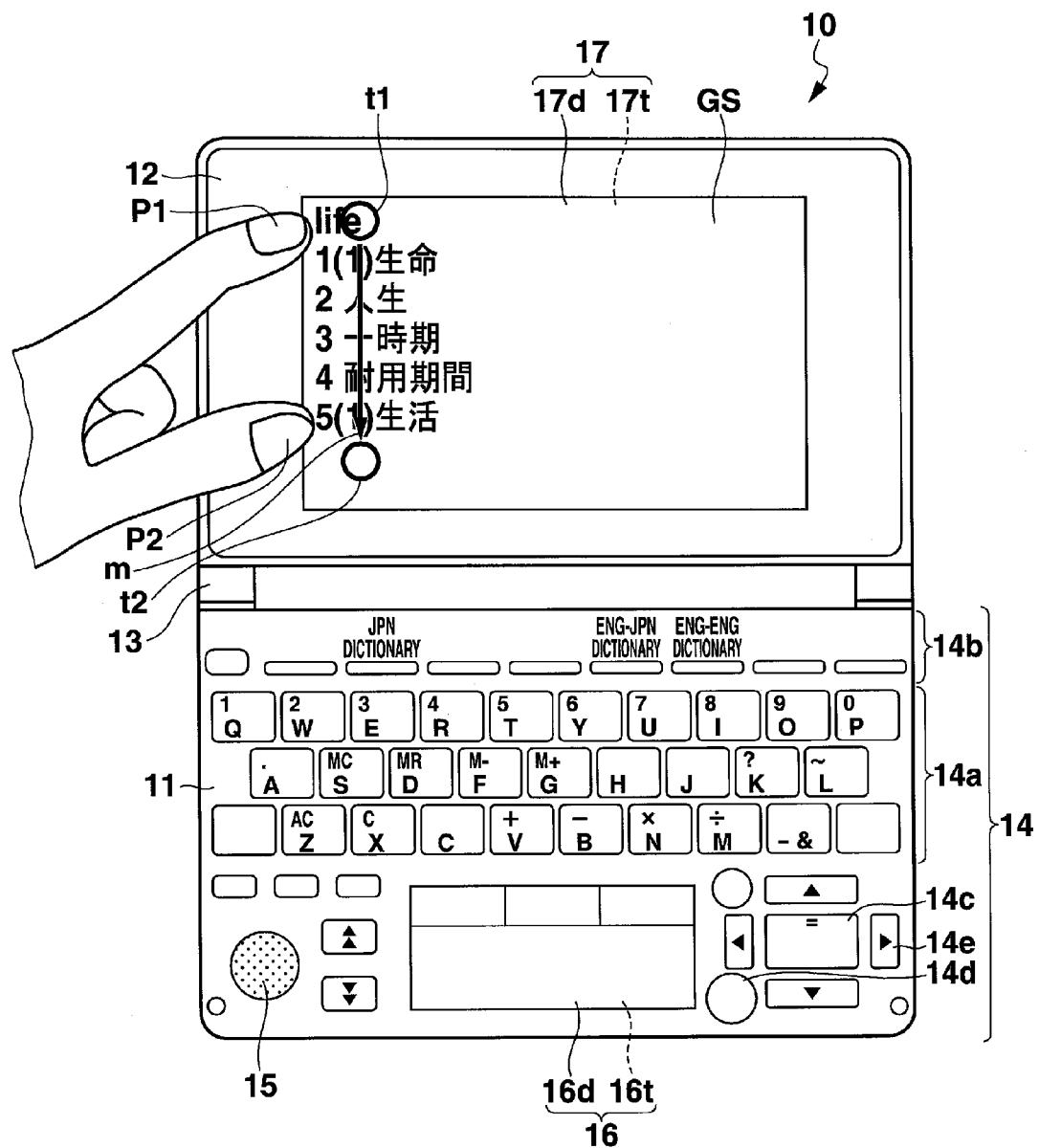
FIG. 1 is a front view showing an external configuration of an electronic dictionary apparatus according to the embodiment of a dictionary-information displaying apparatus of the present invention.

FIG. 1 is a front view showing an external configuration of an electronic dictionary apparatus 10 according to the embodiment of a dictionary-information displaying apparatus of the present invention.

The dictionary-information displaying apparatus consists of a portable device (electronic dictionary apparatus 10) specialized in an electronic dictionary, and/or a touch-panel PDA (Personal Digital Assistants) 10T (Refer to FIG. 4), PC (Personal Computer), a mobile phone, an electronic book, and/or a portable game-machine, which are provided with a dictionary function.

The electronic dictionary apparatus 10 is composed chiefly of a body case 11, a cover case 12, and a hinge member 13. The cover case 12 is connected to the body case 11 by means of the hinge member 13 and can be open on the hinge member 13, as shown in FIG. 1. On the surface of the body case 11 with the cover case 12 open, there are provided a key input unit (keyboard) 14, a speaker 15, and a handwriting input unit (sub-screen) 16. Further, the key input unit 14 comprises character input keys 14a, dictionary designating keys 14b, a [translation/decision] key 14c, a [return/list] key 14d, and cursor keys 14e.

The handwriting input unit (sub-screen) 16 has a structure of a touch-position detecting device with a displaying device combined integrally. The touch-position detecting device has a function of detecting a position(s) on a panel where a user touches with a pen or his/her finger(s) (including multi-touch). The handwriting input unit (sub-screen) 16 is composed of a color liquid crystal displaying screen 16d, for example, of 256×64 dots, covered with a transparent touch panel 16t, and is disposed on the near and central side of the key input unit 14. An input area of the handwriting input unit (sub-screen) 16 can be switched to a hand-written character (kanji) input area for inputting handwritten characters, an icon input area for inputting icons of various functions, or to a handwritten character/icon mixed input area, according to need.

With the handwriting input unit (sub-screen) 16 set to the hand-written character (kanji) input area, a trace of handwriting thereon echoes back to the liquid crystal displaying screen 16*d* to be displayed thereon.

On substantially the whole surface of the cover case 12, there is provided a touch-panel color displaying unit (main screen) 17, for example, of 480×320 dots, covered with a back light. Similarly to the handwriting input unit (sub-screen) 16, the touch-panel color displaying unit (main screen) 17 has a structure of a touch-position detecting device integrally combined with a displaying device, and the touch-position detecting device has a function of detecting a position(s) on a panel where the user touches with a pen or his/her finger(s) (including multi-touch). The touch-panel color displaying unit (main screen) 17 is also composed of a color liquid crystal displaying screen 17*d* covered with a transparent touch panel 17*t*.

For instance, the electric dictionary apparatus 10 has the following functions of displaying dictionary information.

More particularly, the electric dictionary apparatus 10 has a function of setting either one of the following three modes on an explanation-information displaying screen GS corresponding to a direction word retrieved from dictionary data: a representative word-meaning displaying mode; an essential word-meaning displaying mode; and a detailed word-meaning displaying mode. (The explanation-information displaying screen GS corresponding to a direction word retrieved from dictionary data (hereinafter, simply referred to as the "explanation-information displaying screen GS".) means a displaying screen, on which explanation information of the direction word is displayed.)

The "representative word-meaning displaying mode" is for displaying only the first word meaning representative of plural word meanings described as explanation information on the explanation-information displaying screen GS.

The "essential word-meaning displaying mode" is for displaying only the predetermined number of essential word meanings on the explanation-information displaying screen GS. For example, only the first to fifth word meanings are displayed on the explanation-information displaying screen GS.

The "detailed word-meaning displaying mode" is for displaying synonyms and the additional explanation for each word meaning on the explanation-information displaying screen GS.

When the user touches (multi-touch) the explanation-information displaying screen GS at two touch positions t1, t2 with his/her two fingers (multi-touch) P1, P2 and keeps the fingers P1, P2 placed on the screen GS for a predetermined time, and then pinches out, the amount of explanation information to be displayed is increased (detailed explanation information is added to be displayed) in accordance with the distance between the pinched-out touch positions t1 and t2. The electronic dictionary apparatus 10 has a function of displaying the increased amount of explanation information (displaying the explanation information in more detail) on the explanation-information displaying screen GS in accordance with the distance between the pinched-out touch positions t1 and t2.

To make the explanation information more detailed (to display detailed explanation information) means either to increase the ranked word meanings successively from high order (representative word meaning or the first word meaning) to low order or to successively increase synonyms and the additional explanation for each word meaning.

In the specific example shown in FIG. 1, the explanation information corresponding to the direction word "life" is displayed on the explanation-information displaying screen GS. As illustrated, on the explanation-information displaying screen GS with only the representative word meaning displayed, that is, with only the first word meaning of "1(1) 生命" (1(1)life) displayed in the representative word-meaning displaying mode, when the user pinches the first word meaning of "1(1)生命" (1(1)life) between two fingers (multi-touch) P1, P2 in the direction across lines of the word meaning "1(1) 生命" and pinches out (shift the touch positions to increase the distance between them) to the pinched-out touch positions t1 and t2 in the direction across lines of the word meanings as indicated by an arrow "m", then the second line of the word meaning "2人生" (2 human life) . . . to . . . the fifth line of the word meaning "5(1)生活" (5(1)live) following the first line of the word meaning of "1(1)生命" (1(1)life) are successively added and displayed in accordance with the distance between the pinched-out touch positions t1 and t2.

On the contrary, when the user holds the two fingers P1, P2 on the positions (multi-touch positions) t1 and t2 for a predetermined time, and pinches in (shift the touch positions to decrease the distance between them), then the amount of explanation information (lines of the word meanings) to be displayed is decreased or the explanation information is simplified in accordance with the distance between the pinched-in touch positions t1 and t2.

Simplifying the explanation information (simplified explanation information) means to successively decrease the lines of ranked word meanings from low order to high order (representative word meaning or the first word meaning) or to successively decrease synonyms and the additional explanation for each word meaning.

When the user touches (multi-touch) the explanation-information displaying screen GS at the touch positions (multi-touch positions) t1, t2 with his/her two fingers P1, P2, and pinches out (shift the touch positions to increase the distance between them) without holding them at the multi-touch positions t1, t2 for a predetermined time, the electronic dictionary apparatus 10 has a function of displaying the explanation information on the displaying screen GS as characters and/or images enlarged in size in accordance with the distance between the pinched-out touch positions t1 and t2.

On the contrary, when the user pinches in (shift the touch positions to decrease the distance between them) the two fingers P1, P2 without holding them at the positions (multi-touch positions) t1, t2 for a predetermined time, the electronic dictionary apparatus 10 has a function of displaying the explanation information on the displaying screen GS as characters and/or images minified (reduced-size) in accordance with the distance between the pinched-in touch positions t1 and t2.

As described above, when the user simply pinches out or pinches in on the explanation-information displaying screen GS with the explanation information of the retrieved direction word displayed thereon, the amount of information can be easily changed in accordance with the touch positions t1, t2, allowing various users to browse the necessary explanation information in a simple manner.

FIG. 2 is a block diagram of a circuit configuration of the electronic circuit of the electronic dictionary apparatus 10.

The electronic dictionary apparatus 10 is composed of a computer, which reads a program recorded on various recording media or a program transferred from external apparatuses, and operates in accordance with the program. The electronic circuit of the electronic dictionary apparatus 10 is provided with CPU (Central Processing Unit) 21.

CPU 21 controls the whole operation of various circuits in the electronic dictionary apparatus 10 in accordance with a controlling program previously stored in a memory 22. Some controlling program is read into the memory 22 from an external recording medium such as ROM card through a recording medium reading unit 24 or read into the memory 22 from Web server (program server) 30 on the Internet N through a communication unit 25.

The controlling program stored in the memory 22 is activated by an input signal entered in response to the user's operation on the key input unit 14, the handwriting input portion (sub-screen) 16, and/or on the touch-panel color displaying unit (main screen) 17, or by a communication signal for communicating with Web servers 30, 31, . . . on the Internet connected through the communication unit 25, or by a communication signal for connecting with the memory card (recording medium) 23, such as EPROM, RAM, and ROM.

CPU 21 is connected with the memory 22, the recording medium reading unit 24, the communication unit 25, the key input unit 14, the speaker 15, the handwriting input portion (sub-screen) 16, and the touch-panel color displaying unit (main screen) 17 via a bus.

The controlling program stored in the memory 22 includes a system program for controlling the whole operation of the electronic dictionary apparatus 10 and a communication program for performing data communication with Web servers 30, 31, . . . , and user's personal computers (not shown).

Further, in the memory 22 is stored an information-display controlling program 22a not only for displaying dictionary information and various sorts of text data, but also for controlling general processes based on a dictionary database 22b and a text database 22c stored in the memory 22. The general processes include a direction-word retrieving process for retrieving a direction word in response to input of a retrieval word (character string), an information reading/displaying controlling process for reading and displaying explanation information corresponding to the retrieved direction word, wherein the explanation information contains plural ranked word meanings, synonyms for each word meaning, additional explanation thereof (including example sentences), and a display-information controlling process for increasing, decreasing, changing (making detailed) and/or simplifying the amount of information to be displayed, in accordance with the user's multi-touch operation on the explanation-information displaying screen GS in the information reading/displaying controlling process.

In the dictionary database 22b, plural sorts of dictionary data such as [Japanese-language dictionary], [English-Japanese dictionary], [English-English dictionary], [Japanese-English dictionary] are previously stored or these sorts of dictionary data are down-lorded into the dictionary database 22b. In each piece of dictionary data, explanation information is documented, which is associated with direction words arranged according to the Japanese syllabary or in alphabetical order, wherein the explanation information contains plural ranked word meanings of each of the direction words, synonyms for each word meaning and the additional explanation (including example sentences).

It is possible to prepare the dictionary database 22b on Web server (dictionary) 31 instead of providing on the electronic dictionary apparatus 10. In the case where the dictionary database 22b is prepared on the Web server (dictionary) 31, the user selects the Web server (dictionary) 31 and enters retrieval characters. The entered retrieval characters are sent to the Web server (dictionary) 31. The Web server (dictionary) 31 sends back the electronic dictionary apparatus 10 a list of direction words corresponding to the retrieval characters. Then, the user selects a direction word from among the list of direction words, and sends the selected direction word to the Web server (dictionary) 31. The electronic dictionary apparatus 10 receives and obtains explanation information of each of word meanings corresponding to the direction word and displays the explanation information on the displaying unit 17.

FIG. 3 is a view showing a specific example of the explanation information of the direction word "life" in [English-Japanese dictionary] stored in the dictionary database 22b of the electronic dictionary apparatus 10.

In the text database 22c, text data including literary works in various categories, news reports and historical speeches is previously stored, or such text data is down-loaded into the text database 22c.

In a work area of the memory 22, a retrieval-word data memory 22d, a word-meaning displaying mode data memory 22e, and a marker vocabulary-list data memory 22f are secured.

Figure 4:
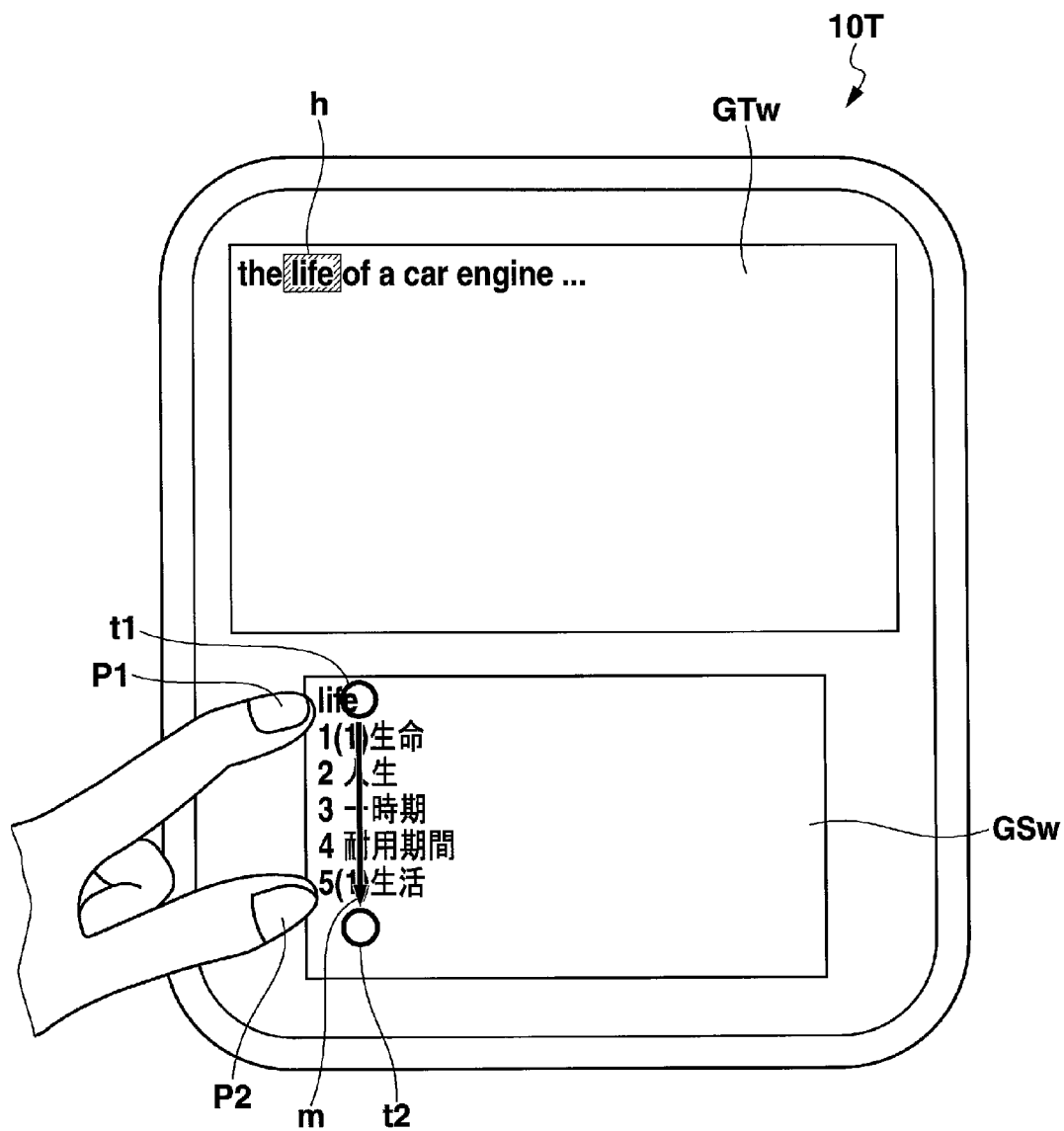
FIG. 4 is a front view showing an external configuration of a touch-panel PDA (Personal Digital Assistants) provided with a dictionary function according to other embodiment of the dictionary-information displaying apparatus of the invention.

When the user selects a dictionary and enters a word (retrieval word) (character string) in a retrieval-word input area on a dictionary retrieving screen of the selected dictionary, the entered retrieval word (character string) is stored in the retrieval-word data memory 22d. Further, in the retrieval-word data memory 22d, a word "h" is stored as a retrieval word, which word "h" is designated and displayed in response to the user's cursor operation or touch operation performed on the explanation-information displaying screen GS displaying the explanation information of the direction word retrieved in accordance with the entered retrieval word or on a display screen (GTw: Refer to FIG. 4) displaying arbitrary text data.

In the word-meaning displaying mode data memory 22e is stored either mode data of the "representative word-meaning displaying mode", "essential word-meaning displaying mode", and "detailed word-meaning displaying mode", previously set by the user.

In the marker vocabulary-list data memory 22f is registered a word, which a marker (marker M: Refer to FIG. 8) is attached to and is displayed, in accordance with the user's operation performed on the explanation-information displaying screen GS.

The coordinate, the moving direction of the touch position (including multi-touch positions) "tn", and the distance between the touch positions detected on the touch-panel color displaying unit (main screen) 17 and/or on the handwriting input unit (sub-screen) 16 are stored in the work area of the memory 22 in real time.

In the electronic dictionary apparatus 10 having the configuration described above, CPU 21 controls operation of various circuits in accordance with instructions written in the information-display controlling program 22a (including programs for performing the direction-word retrieving process, the explanation-information displaying process, and the display-information controlling process). Software and hardware cooperate and work together to realize a function to be described hereinafter.

Taking the embodiments of the electronic dictionary apparatus 10 as examples, the dictionary-information displaying apparatus of the present invention has been described, but it is also possible to realize the functions of the dictionary-information displaying apparatus by use of the touch-panel PDA (Personal Digital Assistants) 10T provided with a dictionary function, shown in FIG. 4, in which input and/or output operations in the processes performed in accordance with the information-display controlling program 22a are displayed as various sorts of windows on the touch-panel color displaying unit 17 (17d, 17t).

FIG. 4 is a front view showing an external configuration of the touch-panel PDA (Personal Digital Assistants) 10T provided with a dictionary function according to other embodiments of the dictionary-information displaying apparatus of the invention.

The touch-panel PDA 10T shown in FIG. 4 shows displaying operations corresponding to (1) the direction-word retrieving (obtaining) process for retrieving (obtaining) the retrieval word "life" at "h" designated and displayed on a text displaying window GTw, (2) the explanation information displaying process for displaying the explanation information of the retrieved direction word "life", and (3) the display-information controlling process for controlling the displayed explanation-information of the retrieved word.

For instance, the explanation-information displaying screen GS displayed on the touch-panel color displaying unit (main screen) 17 of the electronic dictionary apparatus 10 shown in FIG. 1 is displayed as an explanation-information displaying window GSw on the touch-panel PDA 10T, as shown in FIG. 4.

The display-information controlling function will be described, which is realized in the explanation-information displaying process performed in the electronic dictionary apparatus 10 having the configuration described above.

Figure 5A:
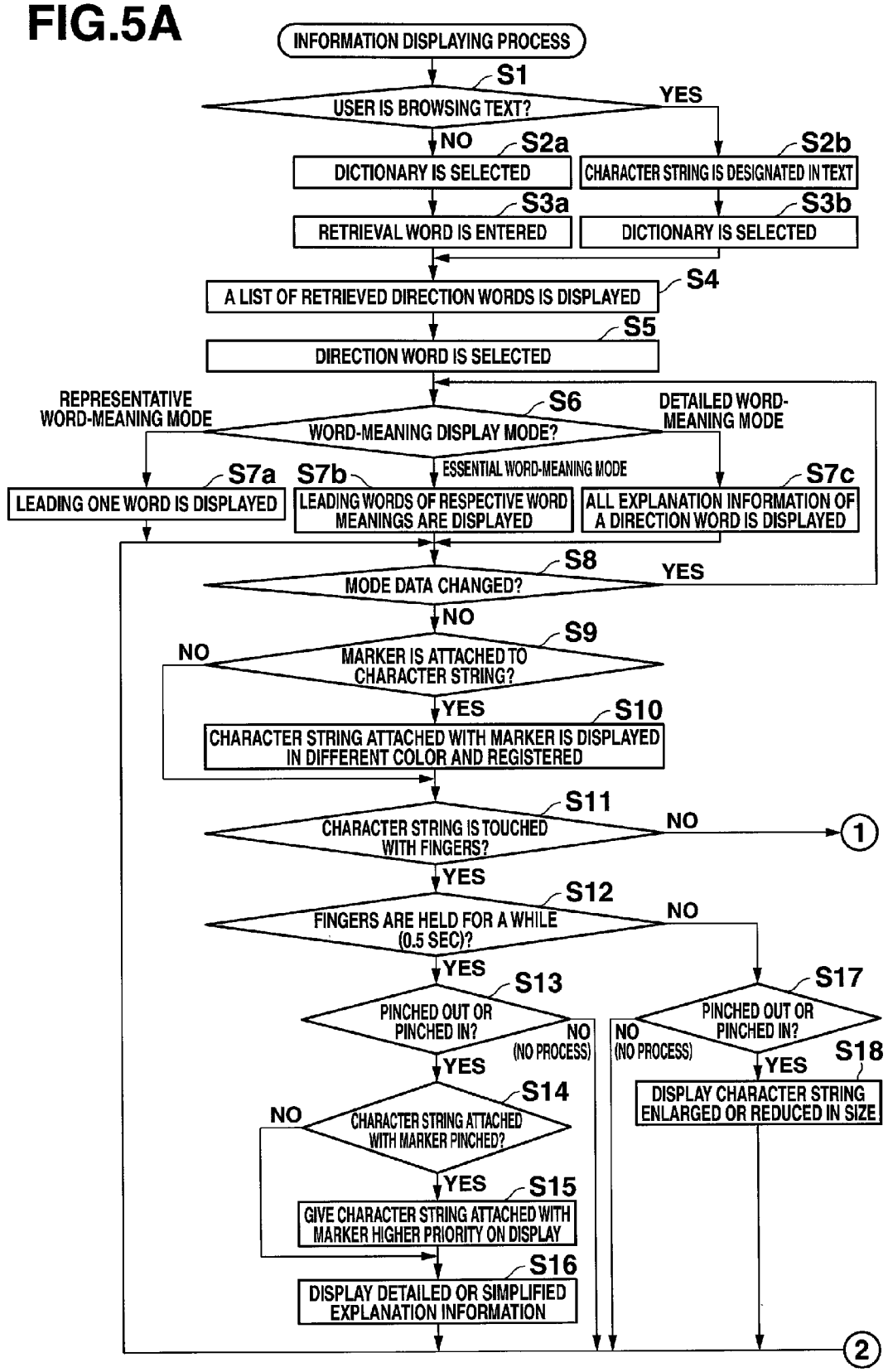
FIG. 5A is a flow chart of an information displaying process (No. 1) performed in the electronic dictionary apparatus, including the direction-word retrieving process, the explanation-information displaying process, and the display-information controlling process.

FIG. 5A is a flow chart of an information displaying process (No. 1) performed in the electronic dictionary apparatus 10, including the direction-word retrieving process, the explanation-information displaying process, and the display-information controlling process.

Figure 5B:
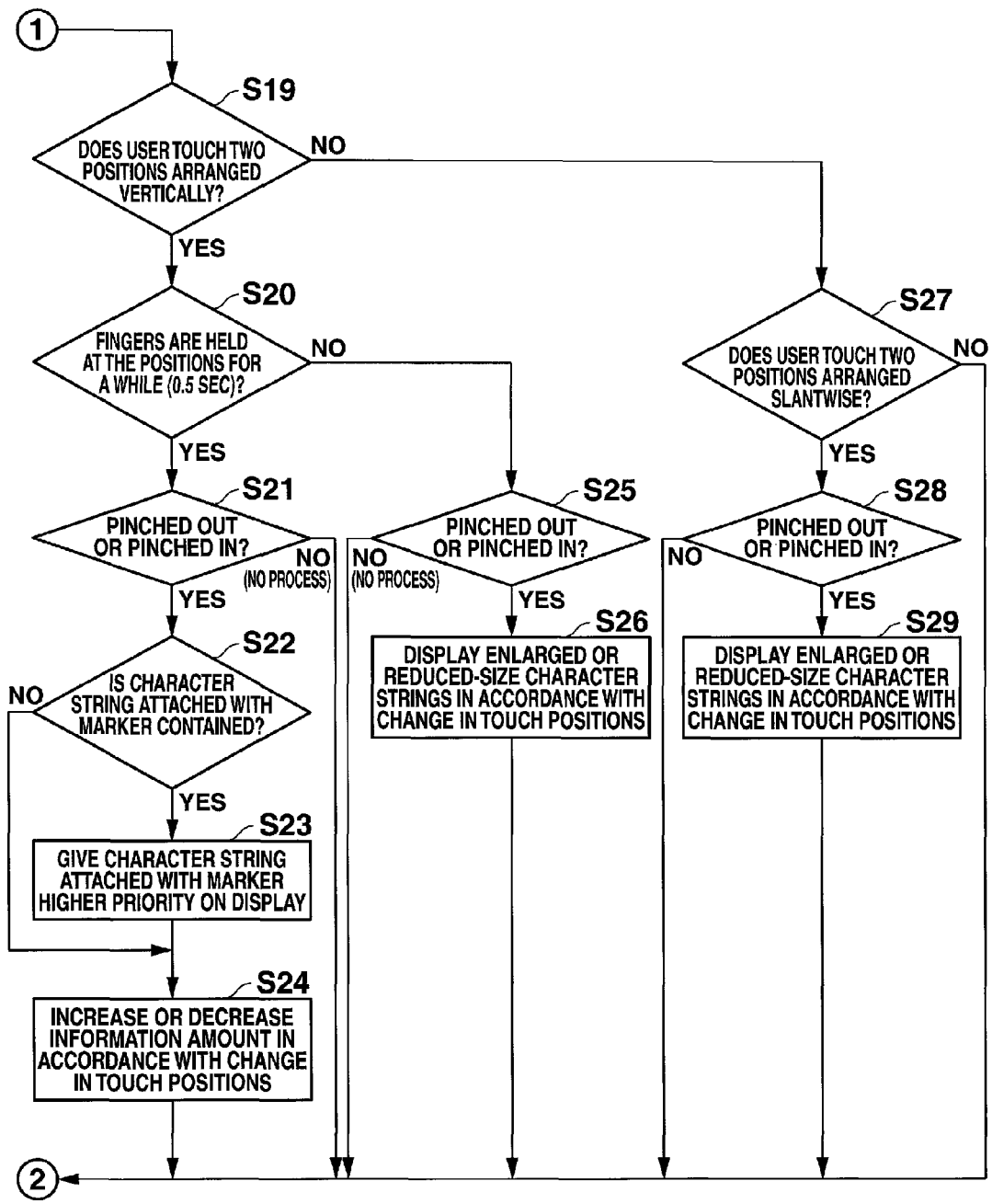
FIG. 5B is a flow chart of an information displaying process (No. 2) performed in the electronic dictionary apparatus, including the direction-word retrieving process, the explanation-information displaying process, and the display-information controlling process.

FIG. 5B is a flowchart of the information displaying process (No. 2) performed in the electronic dictionary apparatus 10, including the direction-word retrieving process, the explanation-information displaying process, and the display-information controlling process.

CPU 21 runs the information-display controlling program 22a to perform the information displaying process in accordance with the flow charts of FIG. 5A and FIG. 5B. Then, the text displaying window GTw is displayed on the touch-panel color displaying unit (hereinafter, "touch-panel displaying unit") 17, and CPU 21 judges whether the user is browsing a text displayed in the text displaying window GTw (step S1 in FIG. 5A).

When it is determined that the user is not browsing a text (NO at step S1), and the user operates the dictionary designating keys 14b to select one dictionary (for instance, [English-Japanese dictionary]) from among the dictionaries stored in the dictionary database 22b, then an input screen (not shown) for inputting the retrieval word (retrieval-word input screen) corresponding to the selected dictionary [English-Japanese dictionary] is displayed on the touch-panel displaying unit 17 (step S2a).

When the user operates the character input keys 14a on the retrieval-word input screen to enter his/her wanted retrieval word (for instance, "life") (step S3a), then direction words having the same leading character as the entered retrieval word "life" are retrieved from the selected dictionary [English-Japanese dictionary] in the electronic dictionary apparatus 10 or on the Web server and a list of the retrieved direction words is displayed (not shown) on the touch-panel displaying unit 17 (step S4).

Meanwhile, when it is determined that the user is browsing an English text displayed in the text displaying window GTw (YES at step S1) and the user designates his/her desired character string "h" (retrieval word) (for instance, "life") among the English text displayed in the text displaying window GTw (Refer to FIG. 4), a selecting screen (dictionary selecting screen) (not shown) for selecting a dictionary (for instance, [English-Japanese dictionary] [English-English dictionary], [English synonyms dictionary]) corresponding to the character sort of the designated character string "life" at "h" is displayed on the touch-panel displaying unit 17 (step S2b).

When the user has selected his/her desired dictionary (for instance, [English-Japanese dictionary]) in the dictionary selecting screen (step S3b), then the direction words having the same leading character as the designated and displayed word "life" at "h" are retrieved from the selected dictionary [English-Japanese dictionary] in the electronic dictionary apparatus 10 or on the Web server, and a list of the retrieved direction words is displayed (not shown) on the touch-panel displaying unit 17 (step S4).

When the user selects his/her desired direction word (for instance, "life") from among the direction words displayed on the touch-panel displaying unit 17 (step S5), CPU 21 reads mode data set in the word-meaning displaying mode data memory 22e to judge which word-meaning displaying mode has been set at present, the "representative word-meaning displaying mode", "essential word-meaning displaying mode" or "detailed word-meaning displaying mode" (step S6).

Figure 6A:
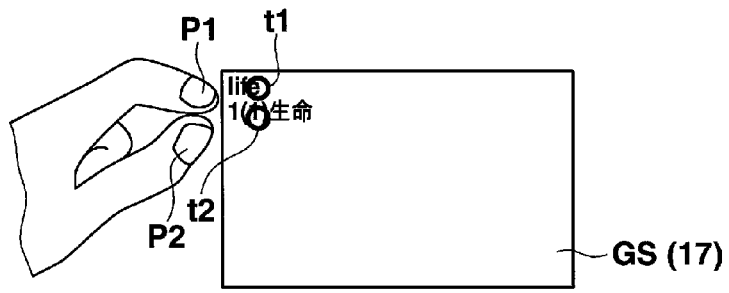
FIG. 6A to FIG. 6C are views showing a specific example (NO. 1) of displaying operations on an explanation-information displaying screen in the information displaying process performed in the electronic dictionary apparatus.

When it is determined that the "representative word-meaning displaying mode" has been set at present, only one word written at the leading space of the line of the first word meaning in the explanation information (FIG. 3) of the selected direction word "life" is read from the [English-Japanese dictionary] in the electronic dictionary apparatus 10 or on the Web server and displayed, for example, as the line of the first word meaning "1(1)生命" (1(1)life) on the explanation-information displaying screen GS of the direction word "life", as shown in FIG. 6A (step S7a).

Figure 6B:
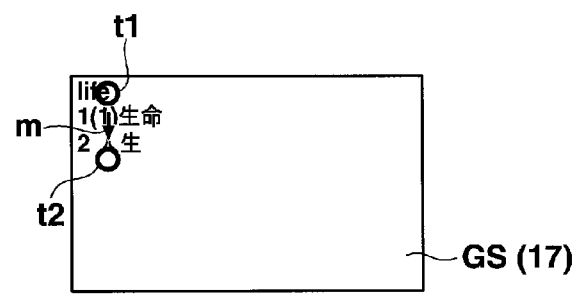
Figure 6C:
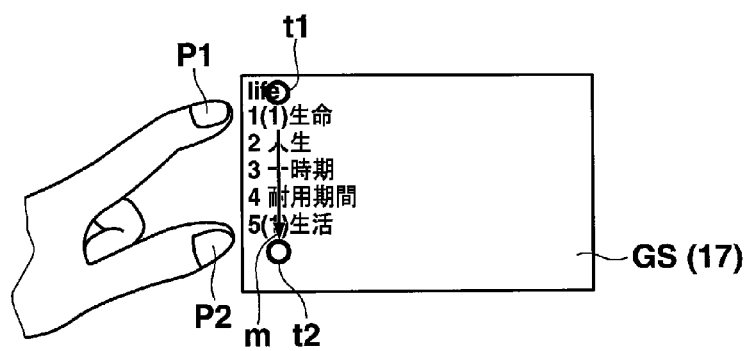

When it is determined that the "essential word-meaning displaying mode" has been set at present, only one words written respectively at the leading spaces of the lines of the first to the fifth word meanings in the explanation information (FIG. 3) of the selected direction word "life" are read from the [English-Japanese dictionary] in the electronic dictionary apparatus 10 or on the Web server and a list of the read words (for example, the first word meaning line "1(1)生命" (1(1)life), the second word meaning line "2人生" (2 human life), the third word meaning line "3一時期" (3 estate), the forth word meaning line "4耐用期間" (4 usable life) and the fifth word meaning line "5(1)生活" (5(1) livelihood)) are displayed on the explanation-information displaying screen GS of the direction word "life", as shown in FIG. 6C (step S7b).

When it is determined that the "detailed word-meaning displaying mode" has been set at present, all the explanation information (FIG. 3) of the selected direction word "life", including pronunciation symbols, all word meaning lines, all the additional explanations in parentheses, [usage example] and marks, are read from the [English-Japanese dictionary]

in the electronic dictionary apparatus 10 or on the Web server and displayed on the explanation-information displaying screen GS of the direction word "life" (step S7c).

When the mode data set in the word-meaning displaying mode data memory 22e has been changed to another mode data in response to the user's operation (YES at step S8), the explanation-information displaying screen GS is displayed, which corresponds to the direction word selected in explanation information corresponding to the changed word-meaning displaying mode (step S6→S7a~S7c).

FIG. 6A to FIG. 6C are views showing a specific example (NO. 1) of displaying operations on the explanation-information displaying screen GS in the information displaying process performed in the electronic dictionary apparatus 10.

As shown in FIG. 6A, only the first word meaning line "1(1)生命" (1(1)life) out of the explanation information of the direction word "life" retrieved from the [English-Japanese dictionary] in the electronic dictionary apparatus 10 or on the Web server is displayed on the explanation-information displaying screen GS in the "representative word-meaning displaying mode" (step S1 to step S7a in FIG. 5a). With the direction word "life" and the first word meaning line "1(1) 生命" (1(1)life) displayed on the explanation-information displaying screen GS, when it is determined that the user touches the display screen GS with his/her fingers P1, P2 at two touch positions t1 (the positions of the direction word "life"), t2 (the positions of the first word meaning line "1(1)生命" (1(1) life) arranged in the vertical direction (the direction across the word meaning lines) so as to pinch the direction word "life" and the first word meaning line "1(1) 生命" (1(1) life) by the fingers (YES at step S19) and holds the fingers at the touch positions t1, t2 for a predetermined time (for example, 0.5 sec.) (YES at step S20), and that the user pinches out (shift touch positions to increase the distance between the touch positions) or moves the fingers P1, P2 in the vertical direction (the direction across the word meaning lines) as indicated by an arrow "m" to the pinched-out touch positions t1, t2, as shown in FIG. 6B and FIG. 6C (YES at step S21), then the second word meaning line "2 人生" (2human life) to the fifth word meaning line "5(1)生活" (5(1)livelihood) are successively displayed in addition to the first word meaning line "1(1) 生命" (1(1)life) in accordance with the distance between the pinched-out touch positions t1, t2 (step S24).

Meanwhile, when it is determined that the user touches the display screen GS with his/her fingers P1, P2 at two touch positions t1, t2 arranged in the vertical direction (the direction across the word meaning lines) so as to pinch the words from the direction word "life" to the fifth word meaning "5(1)生活" (5(1)livelihood) between the fingers P1, P2, as shown in FIG. 6C (YES at step S19) and holds the fingers P1, P2 at the touch positions t1, t2 for a predetermined time (for example, 0.5 sec.) (YES at step S20), and that the user pinches in or moves the fingers P1, P2 in the reverse direction of the pinch-out direction to the pinched-in touch positions t1, t2, as shown in FIG. 6B and FIG. 6A (YES at step S21), then the second word meaning line "2 人生" to the fifth word meaning line "5(1)生活" (5(1) livelihood) are successively deleted and displayed in the order form the fifth to the first word meaning in accordance with the distance between the pinched-in touch positions t1, t2 (step S24).

As described herein, in the "representative word-meaning displaying mode" the user is allowed not only to immediately read the most typical word meaning of his/her desired direction word but also to quickly add or delete other word meanings for review, as needed.

Further, when it is determined that the user touches the display screen GS with his/her fingers P1, P2 at two touch positions t1, t2 located in the vertical direction so as to pinch the first word meaning "1(1)生命" (1(1)life) between the fingers as shown in FIG. 6A (YES at step S19) and pinches out or pinches in (shift touch positions to increase or decrease the distance between touch positions) the fingers P1, P2 in the vertical direction (the direction across the word meaning lines) (YES at step S25) without holding them at the touch positions t1, t2 for a predetermined time (for example, 0.5 sec.) (NO at step S20), then the character string of the explanation information ("1(1)生命" (1(1)life)) initially pinched with two fingers P1, P2 is displayed in an enlarged character-size or in a reduced character-size in accordance with the distance between the pinched-in or pinched-out touch positions t1, t2 (step S26).

Figure 7A:
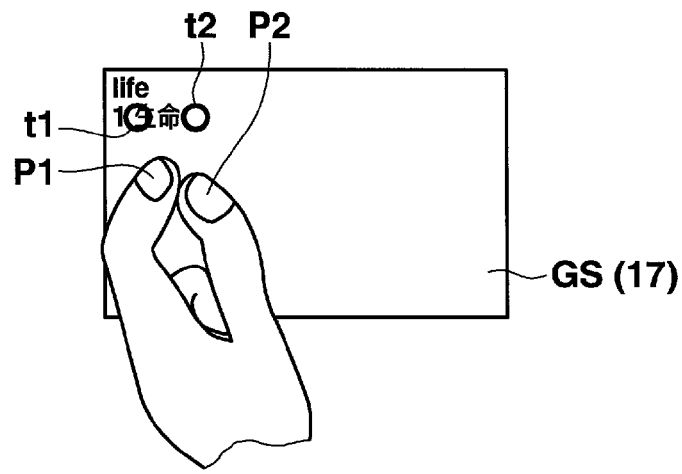
FIG. 7A to FIG. 7C are views showing a specific example (NO. 2) of displaying operations on the explanation-information displaying screen in the information displaying process performed in the electronic dictionary apparatus.
Figure 7B:
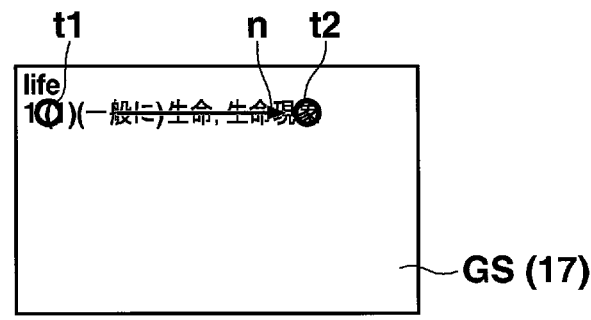
Figure 7C:
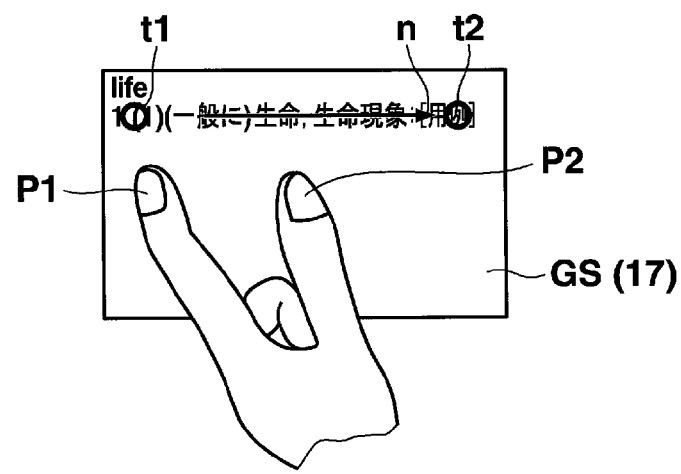

FIG. 7A to FIG. 7C are views showing a specific example (NO. 2) of displaying operations on the explanation-information displaying screen GS in the information displaying process performed in the electronic dictionary apparatus 10.

As shown in the view of FIG. 7A, only the first word meaning "1(1)生命" (1(1)life) out of the explanation information of the direction word "life" retrieved from [English-Japanese dictionary] is displayed on the explanation-information displaying screen GS in the "representative word-meaning displaying mode" (step S1 to step S7a in FIG. 5A). With the direction word "life" and the first word meaning line "1(1)生命" (1(1)life) displayed on the explanation-information displaying screen GS, when it is determined that the user touches the display screen GS with his/her fingers P1, P2 at two touch positions t1, t2 arranged in the horizontal direction (the direction along the word meaning line "1(1) 生命") so as to pinch the first word meaning "1(1)生命" (1(1)life) between the fingers P1, P2 (YES at step S11) and holds the fingers P1, P2 at the touch positions t1, t2 for a predetermined time (for example, 0.5 sec.) (YES at step S12), and that the user pinches out (shift touch positions to increase the distance between touch positions) or moves the fingers P1, P2 in the horizontal direction as indicated by an arrow "n" to the pinched-out touch positions t1, t2, as shown in FIG. 7B and FIG. 7C (YES at step S13), then detailed explanation information of the first word meaning "1(1) 生命" (1(1)life) initially displayed in the pinched range, including the synonyms and the additional explanation ( 生命, (life (in general)), 生命現象 (life phenomenon), ... , ) are successively displayed in accordance with the distance between the touch positions t1, t2 moved in the horizontal direction (step S16).

Meanwhile, when it is determined that the user touches the display screen GS with his/her fingers P1, P2 at two touch positions t1, t2 arranged in the horizontal direction (the direction along the word meaning line "1(1)生命") so as to pinch one whole line including the first word meaning "1(1)生命" (1(1)life) between the fingers P1, P2, as shown in FIG. 7C (YES at step S11) and holds the fingers P1, P2 at the touch positions t1, t2 for a predetermined time (for example, 0.5 sec.) (YES at step S12), and that the user pinches in or moves the fingers P1, P2 in the horizontal direction (the direction along the word meaning line "1(1) 生命") to the pinched-in touch positions t1, t2, as shown in FIG. 7B and FIG. 7A (YES at step S13), then detailed explanation information initially displayed in the pinched range ("( 般に )生命" (life (in general)), "生命現象" (life phenomenon), ... , ) are successively simplified (deleted) in accordance with the distance between the pinched-in touch positions t1, t2 arranged in the horizontal direction, and finally only the leading word meaning "生命" (life) is left and displayed, as shown in FIG. 7A (step S16).

As described above, in the "representative word-meaning displaying mode" the user is allowed not only to immediately read only the most typical word meaning of his/her desired direction word but also to quickly see detailed and/or simplified explanation information of the representative word meaning, as needed.

Further, when it is determined that the user touches the display screen GS with his/her fingers P1, P2 at two touch positions t1, t2 located in the horizontal direction so as to pinch the first word meaning "1(1)生命" (1(1)life) between the fingers P1, P2, as shown in FIG. 7A (YES at step S11) and pinches out or pinches in the horizontal direction (the direction along the word meaning line "1(1)生命") (YES at step S17) without holding them at the touch positions t1, t2 for a predetermined time (for example, 0.5 sec.) (NO at step S12), then the character string "生命" (life) displayed between the initial touch positions t1, t2 is displayed in an enlarged character-size or in a reduced character-size in accordance with the distance between the pinched-in or pinched-out touch positions t1, t2 (step S18).

Figure 8A:
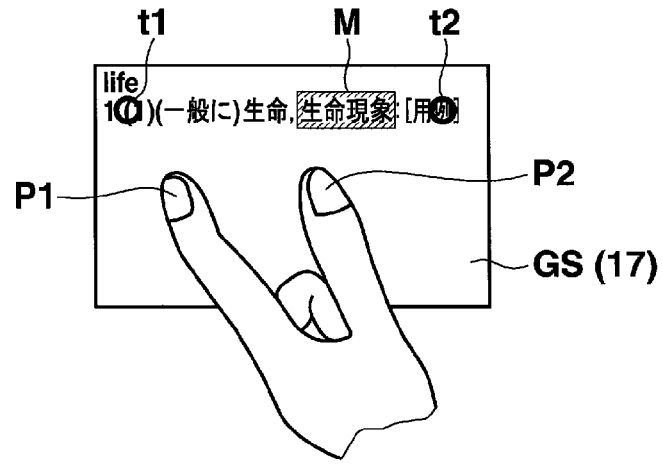
FIG. 8A to FIG. 8C are views showing a specific example (NO. 3) of displaying operations on the explanation-information displaying screen in the information displaying process performed in the electronic dictionary apparatus.
Figure 8B:
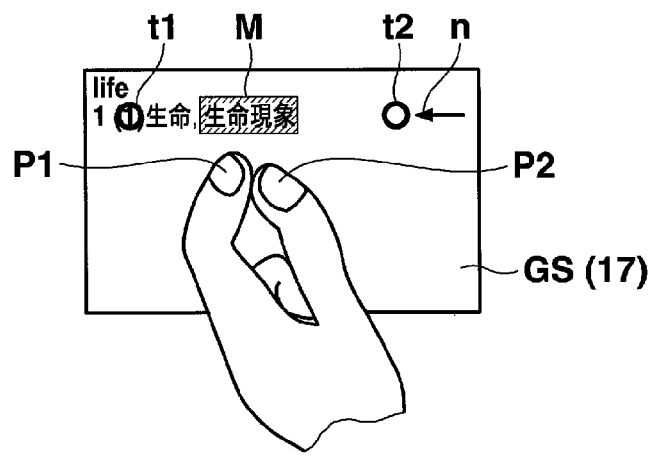
Figure 8C:
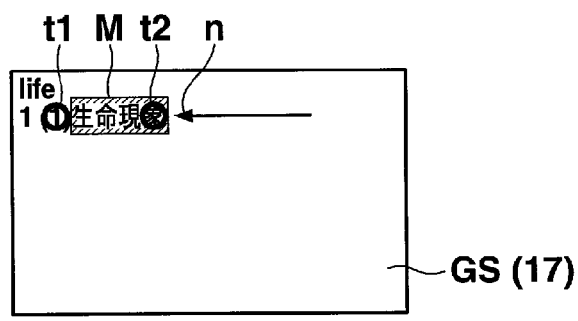

FIG. 8A to FIG. 8C are views showing a specific example (NO. 3) of displaying operations on the explanation-information displaying screen GS in the information displaying process performed in the electronic dictionary apparatus 10.

For instance, with detailed explanation information of the first word meaning of the user's desired direction word "life", ("(一般に)生命" (life (in general)), "生命現象" (life phenomenon): [用例] (usage example)) displayed as shown in the view of FIG. 7C, when a marker is attached to a noticed character string (for instance, "生命現象" (life phenomenon)) in response to the user's operation (YES at step S9), the character string "生命現象" (life phenomenon)) attached with a marker is displayed in designated color (marker-display M) as shown in FIG. 8A and is associated with the direction word "life" and registered in the marker vocabulary-list data memory 22f (step S10).

As described above, with the explanation information including the character string "生命現象" (life phenomenon) displayed in the designated color (marker-display M) on the display screen GS, when it is determined that the user touches the display screen GS with his/her fingers P1, P2 at two touch positions t1, t2 located in the horizontal direction (the direction along the word meaning line "1(1)生命") (in other words, when it is determined that the user touches the display screen GS with his/her fingers P1, P2 at the head (touch position t1) and the end (touch position t2) of the word meaning line "1(1) (一般に)生命, 生命現象：[用例]") so as to pinch the line of the explanation information including the character string between the fingers P1, P2 (YES at step S11) and holds the fingers P1, P2 at the touch positions t1, t2 for a predetermined time (for example, 0.5 sec.) (YES at step S12), and that the user has pinched in or moves the fingers P1, P2 in the horizontal direction (the direction of the line of the word meaning) so as to reduce the distance between the touch positions (pinched-in touch positions) t1, t2, as shown in FIG. 8B and FIG. 8A (YES at step S13), then it is determined that the character string "生命現象" (life phenomenon) displayed in the designated color (marker-display M) is pinched between the pinched-in touch positions t1, t2 (YES at step S14), and the character string "生命現象" (life phenomenon) attached with the marker is set to be given a higher priority on display than other character strings (step S15).

Then, the detailed explanation information "(一般に)生命" (life (in general)), "生命現象" (life phenomenon): , . . . , ) displayed between the initial touch positions t1, t2 is successively simplified in accordance with the distance between the touch positions t1, t2 reduced along the line in the horizontal direction (the direction of the line of the word meaning), and finally only the character string "生命現象" (life phenomenon) attached with the marker and given the higher priority on display is left and displayed (step S16).

As shown in FIG. 6A to FIG. 6C, even in the case where the user touches the displaying screen GS with two fingers at the touch positions t1, t2 located in the vertical direction (the direction across lines of the word meanings) so as to pinch the explanation of word meanings between the fingers and pinches out or pinches in to increase or decrease the distance between the touch positions t1, t2, thereby increasing or decreasing the ranked word meanings to be displayed, if the character string attached with the marker is contained in such explanation of word meanings to be displayed, said character string attached with the marker is set to a higher priority on display, and is additionally displayed or deleted on a priority basis (steps S22 to S24).

On the explanation-information displaying screen GS of the user's desired direction word, even if the user should pinch out or pinch in to increase or decrease the distance between the touch positions t1, t2, thereby making the explanation information further detailed or more simplified to change the amount of information, the character string of the word, which the user deems important and is registered in the marker vocabulary-list data memory 22f, can be always displayed on a priority basis.

Figure 9A:
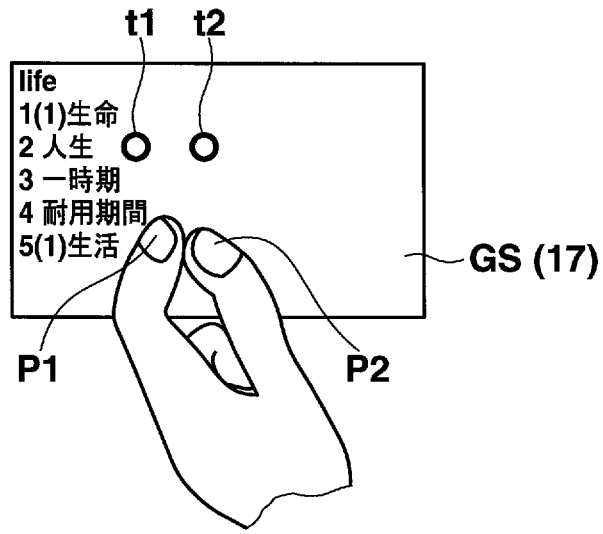
FIG. 9A to FIG. 9C are views showing a specific example (NO. 4) of displaying operations on the explanation-information displaying screen in the information displaying process performed in the electronic dictionary apparatus.
Figure 9B:
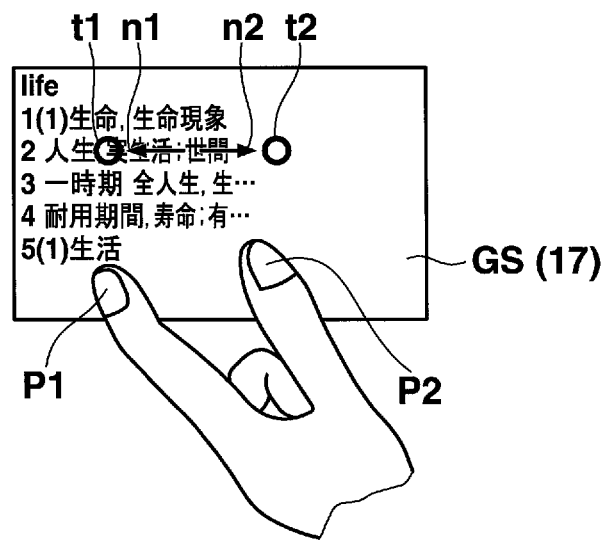
Figure 9C:
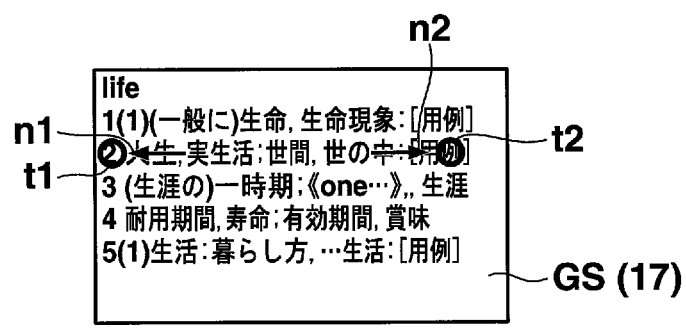

FIG. 9A to FIG. 9C are views showing a specific example (NO. 4) of displaying operations on the explanation-information displaying screen GS in the information displaying process performed in the electronic dictionary apparatus 10.

In the specific examples described with reference to FIG. 7A to FIG. 8C, only the explanation information of the appropriate word meaning is made detailed or simplified in response to the user's operation of increasing or decreasing the distance between the two touch positions t1, t2 pinching the line of the word meaning displayed on the explanation-information displaying screen GS (step S11 to step S16). On the contrary, as shown in FIG. 9A, when the explanation-information displaying screen GS displays word meaning lines, and a user touches the screen with the fingers at two touch positions t1, t2 where no word meaning line is displayed between the fingers and holds the fingers at the touch positions t1, t2 for a predetermined time, and then pinches out or pinches in along a line, as shown in FIG. 9B and FIG. 9C, then detailed or simplified explanation information of all the word meaning lines are displayed in accordance with the pinch-out or pinch-in operation.

As shown in FIG. 9A, when the explanation-information displaying screen GS displays word meaning lines, and a user touches the screen with his/her fingers at two touch positions t1, t2 where no word line is displayed between the fingers and has pinched out or pinched in without holding the fingers at the touch positions t1, t2 for a predetermined time, then explanation information of all the word meaning lines are displayed in an enlarged character-size or in a reduced character-size in accordance with the pinch-out or pinch-in operation.

Figure 10A:
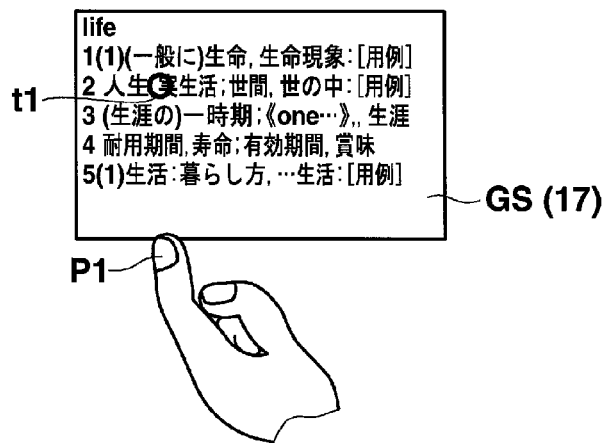
FIG. 10A to FIG. 10C are views showing a specific example (NO. 5) of displaying operations on the explanation-information displaying screen in the information displaying process performed in the electronic dictionary apparatus.
Figure 10B:
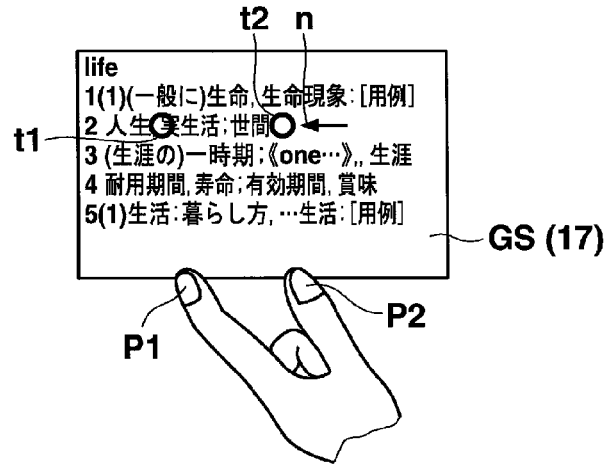
Figure 10C:
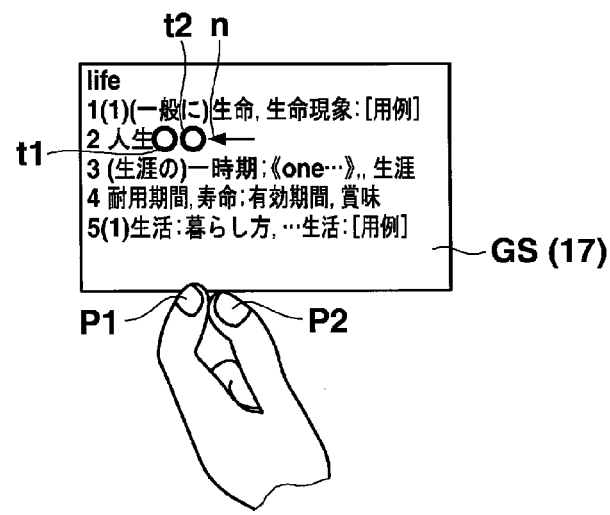

FIG. 10A to FIG. 10C are views a showing specific example (NO. 5) of displaying operations on the explanation-information displaying screen GS in the information displaying process performed in the electronic dictionary apparatus 10.

FIG. 10A is a view showing the explanation information of the direction word "life" retrieved from [English-Japanese dictionary], which is displayed on the explanation-information displaying screen GS in detail to the allowable range from the beginning in the "detailed word-meaning displaying mode". With the explanation information of the direction word "life" displayed on the explanation-information displaying screen GS (step S1 to step S7c in FIG. 5A), when it is determined that the user touches the display screen GS with his/her fingers P1, P2 at the head (touch position t1) and the end (touch position t2) of "実 生活~「 用例 」" (real life~[usage example]) in the explanation of the second word meaning "人生" (human life) displayed on the explanation-information displaying screen GS (YES at step S11), and holds the fingers P1, P2 at the touch positions t1, t2 for a predetermined time (for example, 0.5 sec.) (YES at step S12), and that the user moves the finger P2 toward the finger P1 in the direction as indicated by an arrow "n", in other words, the user moves the touch position t2 toward the touch position t1, as shown in FIG. 10B and FIG. 10C (YES at step S13), then the explanation information of the second word meaning "人生" (human life), "実生活~「 用例 」" (real life~[example]) initially displayed in the range is successively deleted from the end of the line in a convolutional manner (or is simplified and displayed) in accordance with the distance between the moved touch positions t1, t2 (step S16).

As described above, in the "detailed word-meaning displaying mode" the user is allowed not only to immediately see only detailed explanation information of each word meaning of his/her desired direction word but also to quickly see a portion of the explanation information of some of word meanings in a convolutional manner, as needed.

FIG. 11A to FIG. 11(D) are views showing a specific example (NO. 6) of displaying operations on the explanation-information displaying screen GS in the information displaying process performed in the electronic dictionary apparatus 10.

Figure 11A:
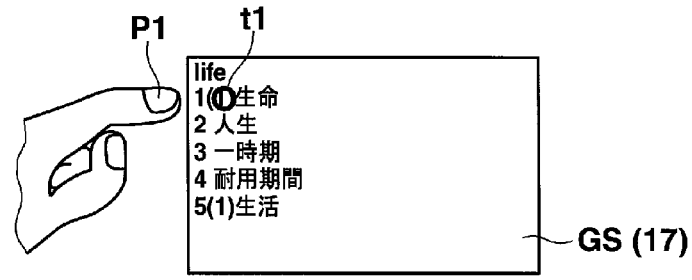
FIG. 11A to FIG. 11D are views showing a specific example (NO. 6) of displaying operations on the explanation-information displaying screen in the information displaying process performed in the electronic dictionary apparatus.
Figure 11B:
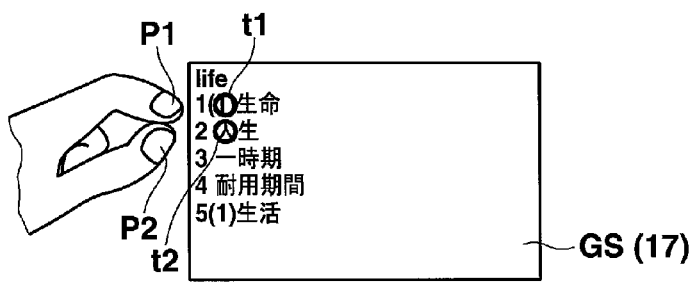
Figure 11C:
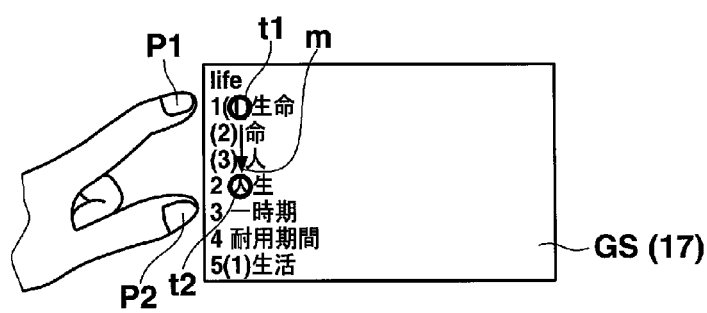

FIG. 11A is a view showing the explanation information of the direction word "life" retrieved from [English-Japanese dictionary], which is displayed on the explanation-information displaying screen GS in the "essential word-meaning displaying mode", more particularly, a list of leading word meaning lines of the first to the fifth word meaning, that is, a list of "1(1)生命" (1(1)life), "2人生" (2human life), "3 一時期" (3estate), "4 耐用年数" (4usable life), and "5(1) 生活" (5(1)livelihood), which is displayed on the explanation-information displaying screen GS (step S1 to step S7b in FIG. 5A). With the list of leading word meaning lines displayed on the explanation-information displaying screen GS, when it is determined that the user touches the display screen GS with his/her fingers P1, P2 at the touch positions t1 the first word meaning "1(1)生命" (1(1)life), t2 arranged in the vertical direction (the direction across lines of the word meanings) to pinch a space left between the line of the first word meaning "1(1)生命" (1(1)life) and the line of the second word meaning "2人生" (2human life) between the fingers P1, P2 (YES at step S19), as shown in FIG. 11B and holds the fingers P1, P2 at the touch positions t1, t2 for a predetermined time (for example, 0.5 sec.) (YES at step S20), and that the user pinches out (shift touch positions to increase the distance between the touch positions) or moves the fingers P1, P2 toward the pinched-out touch positions t1, t2 in the vertical direction (the direction across lines of the word meanings) as indicated by an arrow "m", as shown in FIG. 11C and FIG. 11(D) (YES at step S21), then the subsidiary word meaning and the following word meanings, "(2) 命" ((2)life), "(3) 人" ((3)human), "(4)生き物" ((4)being) belonging to the first word meaning (1(1)life), which is displayed initially and ranked at a high order, are successively added and displayed in accordance with the increasing distance between the pinched-out touch positions t1, t2 (step S24).

Figure 11D:
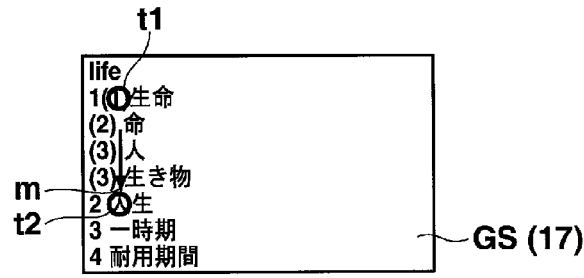

Meanwhile, when it is determined that the user touches the display screen GS with his/her fingers P1, P2 at the touch positions t1, t2 to pinch the first word meaning, "1(1)生命" (1(1)life) and the subsidiary word meanings line, "(2)命" ((2)life), "(3)人" ((3)human), "(4)生き物" ((4)being) between the fingers P1, P2, as shown in FIG. 11D (YES at step S19), and holds the fingers P1, P2 at the touch positions t1, t2 for a predetermined time (for example, 0.5 sec.) (YES at step S20), and that the user pinches in (shift touch positions to decrease the distance between the touch positions) to the pinched-in touch positions t1, t2 in the direction opposite to that indicated by the arrow "m", the direction across lines of the word meanings displayed on the display unit and the shifted across lines of the word meanings displayed on the display unit direction, as shown in FIG. 11D and FIG. 11C (YES at step S21), then the subsidiary word meanings "(2) 命" ((2)life), "(3) 人" ((3)human), "(4) 生き物" ((4)being) displayed initially between the touch positions t1, t2 are successively deleted in a convolutional manner in accordance with the decreasing distance between the pinched-in touch positions t1, t2 (step S24).

As described above, in the "essential word-meaning displaying mode" the user is allowed not only to immediately see only a list of main word meanings of his/her desired direction word but also to quickly see increased subsidiary word meanings of his/her desired word meaning, or decreased subsidiary word meanings in a convolutional manner, as needed.

FIG. 12A to FIG. 12D are views showing a specific example (NO. 7) of displaying operations on the explanation-information displaying screen GS in the information displaying process performed in the electronic dictionary apparatus 10.

Figure 12A:
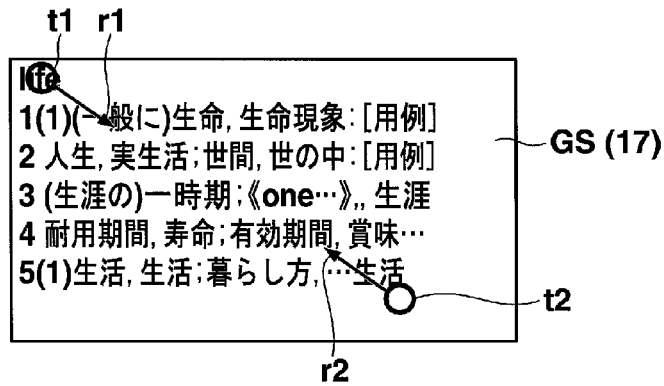
FIG. 12A to FIG. 12D are views showing a specific example (NO. 7) of displaying operations on the explanation-information displaying screen in the information displaying process performed in the electronic dictionary apparatus.
Figure 12B:
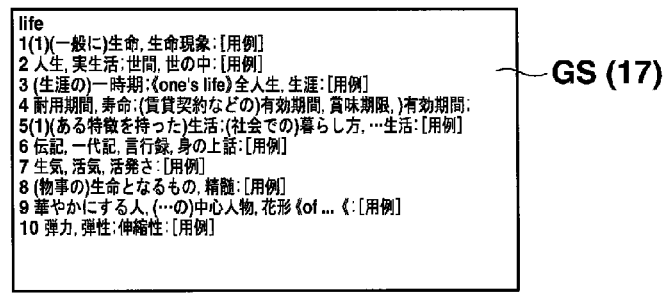

FIG. 12A is a view showing the detailed explanation information of the first to the fifth word meanings of the direction word "life", which is retrieved from [English-Japanese dictionary] and displayed on the explanation-information displaying screen GS in the "essential word-meaning displaying mode", more particularly, showing the first to the fifth word meanings "1(1)生命" (1(1)life), "2 人生" (2human life), "3 一時期" (3estate), "4 耐用年数" (4usable life), and "5(1)生活" (5(1)livelihood), which are displayed on the displaying screen GS as in detail as possible. With the first to the fifth word meanings displayed on the explanation-information displaying screen GS (step S1 to step S7c, step S11 to step S16, in FIG. 5A), when it is determined that the user touches the display screen GS with his/her fingers P1, P2 at the touch positions t1, t2 arranged slantwise (shifted diagonally) to pinch the first to the fifth word meanings, "1(1) 生命" (1(1)life), "2人生" (2human life), "3 時期" (3estate), "4 耐用年数" (4usable life), and "5(1)生汪" (5(1)livelihood), between the fingers P1, P2, as shown in FIG. 12A (YES at step S27), and pinches in at a slant (diagonally) as indicated by arrows r1, r2 (YES at step S28), then the character strings of the explanation information in a range defined by the initial touch positions t1, t2 are reduced in size and displayed in accordance with change in the touch positions t1, t2, as shown in FIG. 12B (step S29).

Figure 12C:
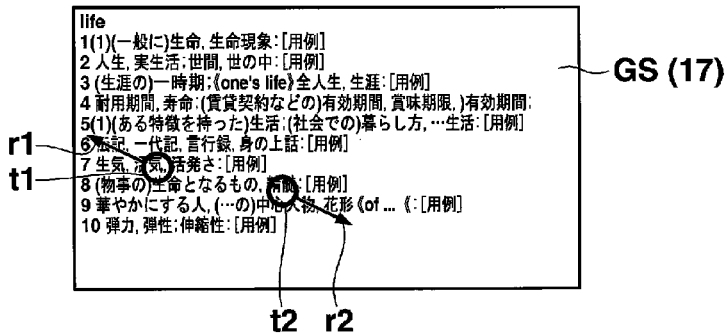
Figure 12D:
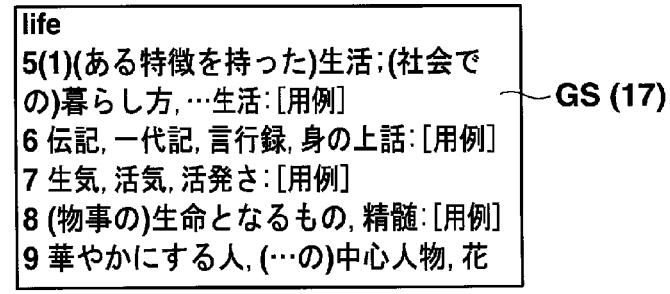

Further, for example, as shown in FIG. 12C, with the first word meaning "1(1)生命" (1(1) life) to the tenth word meanings "弾力" (elastic force) of the direction word "life" displayed on the explanation-information displaying screen GS in detail to the allowable extent, (step S1 to step S7c, step S11 to step S16), when it is determined that the user touches the display screen GS with his/her fingers P1, P2 at the touch positions t1, t2 to pinch the vicinity to the seventh word meaning "7生気" (7viridity) between the fingers P1, P2 (YES at step S27), and pinches out slantwise (diagonally) as indicated by arrows r1, r2, as shown in FIG. 12C (YES at step S28), then the character strings of the explanation information including the seventh word meaning "7生気" (7viridity) at the center in the range defined by the initial touch positions t1, t2 are displayed in an enlarged character-size or in a reduced character-size in accordance with change in the touch positions t1, t2, as shown in FIG. 12D (step S29).

As described above, with the explanation information displayed on the explanation-information displaying screen GS of the user's desired direction word, pinching necessary information among the explanation information with two fingers P1, P2 and pinching out or in slantwise, the user can see the explanation information including the pinched information at the center in enlarged characters or in reduced-size characters.

Figure 13A:
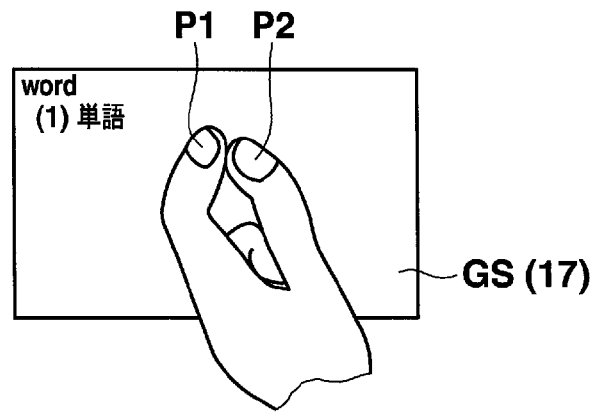
FIG. 13A to FIG. 13C are views showing a specific example (NO. 8) of displaying operations on the explanation-information displaying screen in the information displaying process performed in the electronic dictionary apparatus.
Figure 13B:
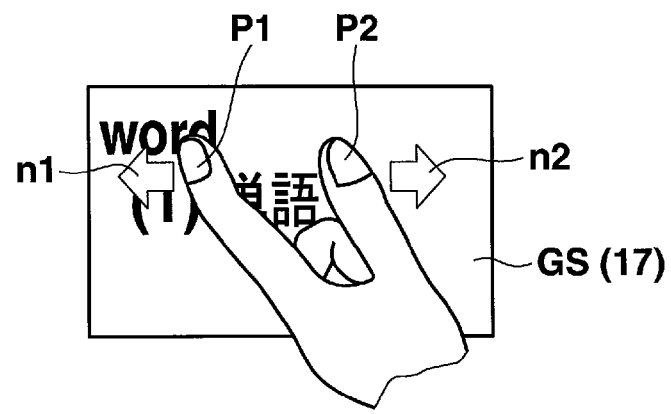
Figure 13C:
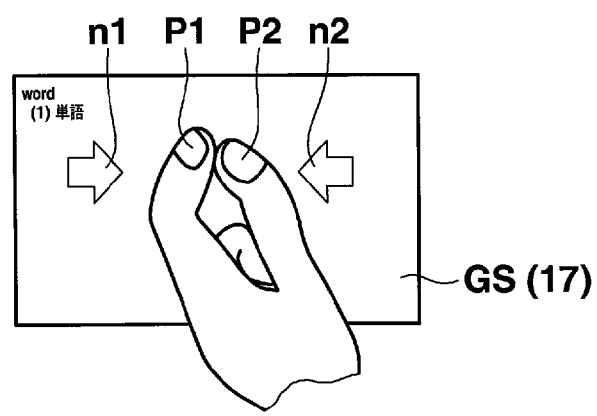

FIG. 13A to FIG. 13C are views showing a specific example (NO. 8) of displaying operations on the explanation-information displaying screen GS in the information displaying process performed in the electronic dictionary apparatus 10.

As shown in FIG. 13A, when it is determined that the user touches the explanation-information displaying screen GS with his/her fingers at two touch positions P1, P2 where no explanation information is displayed, and pinches out or pinches in the direction as indicated by arrows n1, n2, as shown in FIG. 13B and FIG. 13C, without holding the fingers at the touch positions P1, P2, then a configuration can be employed, which displays character strings of all the explanation information on display at the time are displayed in an enlarged character-size or in a reduced character-size in accordance with the distance between the pinched-out or pinched-in positions P1, P2.

The information-display controlling function (hereinafter, referred to as the "information-display controlling function of the electronic dictionary apparatus 10") realized in the explanation-information displaying process performed in the electronic dictionary apparatus 10 having the above mentioned configuration will be described. That is, the information-display controlling function of the electronic dictionary apparatus 10 is capable of displaying the explanation information in more detail or the simplified explanation information on the explanation-information displaying screen GS of the direction word, depending on whether the two touch positions t1, t2 on the displaying screen GS have been moved to increase or decrease the distance between the touch positions t1, t2, when compared with the initial distance between them.

Therefore, various users are allowed to browse various amounts of dictionary information in a simple manner.

When the user touches the explanation-information displaying screen GS at two touch positions t1, t2 to pinch a word meaning and pinches out or pinches in the horizontal direction (the direction along the line of the a word meaning), the information-display controlling function of the electronic dictionary apparatus 10 can display synonyms for said word meaning in more detail and/or the simplified synonyms for said word meaning, allowing the user to easily select only his/her desired word to see the details quickly or to hide them.

When the user touches the explanation-information displaying screen GS at two touch positions t1, t2 to pinch a word meaning displayed on the displaying screen GS and pinches out or pinches in in the vertical direction (the direction across lines of the word meanings), the information-display controlling function of the electronic dictionary apparatus 10 can successively add other ranked word meanings in addition to said word meaning and/or can successively delete the explanation information of said word meaning, thereby allowing the user to quickly confirm other word meanings as many as needed in addition to the word meaning on display.

When a character string registered in the marker vocabulary-list data memory 22f and displayed in designated color (marker-display M) is contained in the explanation information displayed on the explanation-information displaying screen GS, the information-display controlling function of the electronic dictionary apparatus 10 can always display said character string displayed in designated color (marker-display M) as a word of high priority, even in the case where the detailed or simplified explanation information is displayed depending on change in the distance between the two touch positions t1, t2 on the explanation-information displaying screen GS.

The information-display controlling function of the electronic dictionary apparatus 10 performs the process for displaying detailed or simplified explanation information depending on change in the distance between the two touch positions t1, t2 on the explanation-information displaying screen GS, when the user's fingers are kept at the initial touch positions t1, t2 for a predetermined time, but displays the character strings of the explanation information on display in an enlarged character-size or in a reduced character-size, depending on change in the distance between the two touch positions t1, t2 on the explanation-information displaying screen GS, when the user's fingers are not kept at the initial touch positions t1, t2 for a predetermined time.

As described above, even if the user touches the explanation-information displaying screen GS at two positions (multi-touch) in a similar manner, the information-display controlling function of the electronic dictionary apparatus 10 can simply switch whether to display detailed or simplified explanation information as needed or to display the character strings of the explanation information on display as enlarged character strings or reduced-size character strings.

When the user touches the explanation-information displaying screen GS at two touch positions t1, t2 and pinches out or pinches in at a slant on the explanation-information displaying screen GS, the information-display controlling function of the electronic dictionary apparatus 10 displays character strings of the explanation information on display in an enlarged character-size or in a reduced character-size in accordance with change in the distance between the touch positions t1, t2.

The information-display controlling function of the electronic dictionary apparatus 10 allows the user to easily perform operation to display the explanation information on display as enlarged or reduced-size information as needed without failure.

Other Embodiments

In the embodiments described with reference to FIG. 6A to FIG. 13C, the user touches (multi-touch) the explanation-information displaying screen GS with his/her fingers P1, P2 of one hand, but needless to say, the user can perform the similar operations using the fingers P1, P2 of both hands.

Figure 14A:
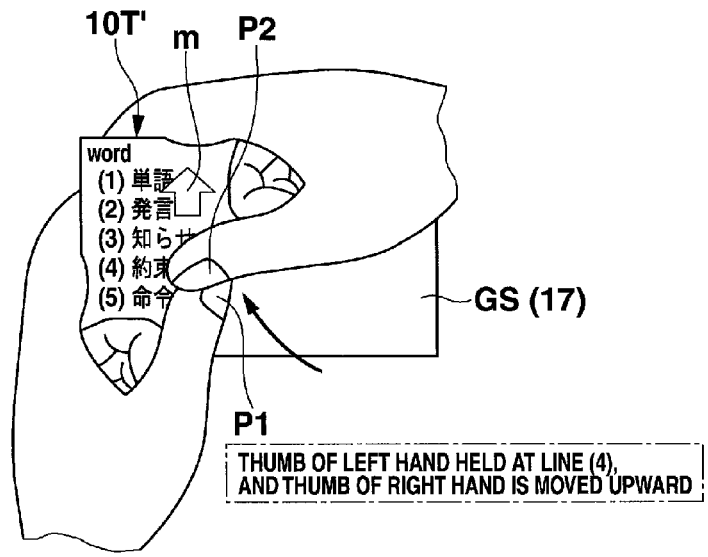
FIG. 14A and FIG. 14B are is views showing a specific example (No. 1) of displaying operation by both hands on an explanation-information displaying screen in the information displaying process performed in touch-panel PDA (Personal Digital Assistants).
Figure 14B:
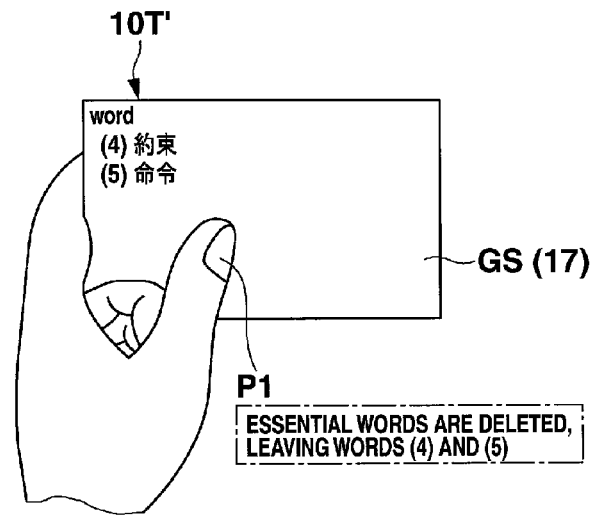

FIG. 14A and FIG. 14B are views showing a specific example (No. 1) of displaying operation by both hands on the explanation-information displaying screen GS in the information displaying process performed in the touch-panel PDA (Personal Digital Assistants) 10T'.

FIG. 14A is a view showing the explanation-information displaying screen GS of the touch-panel PDA (Personal Digital Assistants) 10T', on which the first word meaning "1 単語" (1word) to the fifth word meaning "5 命令" (5instruction) are displayed in the "essential word-meaning displaying mode". As shown in FIG. 10A, the user holds PDA 10T' with both hands and touches the fourth word meaning "4 約束" (4 promise) with the thumb P1 of the left hand, and meanwhile touches the third word meaning "3 知らせ" (3notice) with the thumb P2 of the right hand. Then, the user moves the thumb P2 upward from the third word meaning "3 知らせ" (3notice) toward the first word meaning "単語" (1word) in the vertical direction (the direction across lines of the word meanings) as indicated by an arrow "m", as shown in FIG. 14A.

Then, the first word meaning "1 単語" (1word) to the third word meaning "3 知らせ" (3notice) falling in a range where the thumb P2 moves through successively disappear in reverse rank order in a convolutional manner, with only "4 約束" (4 promise) and "5 命令" (5instruction) left displayed, as shown in FIG. 14B.

Figure 15A:
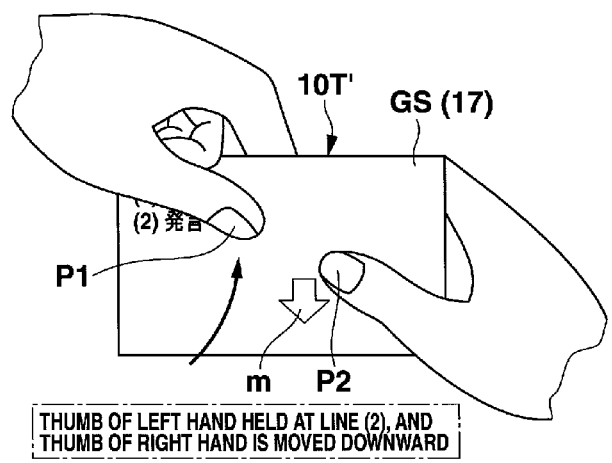
FIG. 15A and FIG. 15B are is views showing a specific example (No. 2) of another displaying operation by both hands on an explanation-information displaying screen in the information displaying process performed in the touch-panel PDA (Personal Digital Assistants).
Figure 15B:
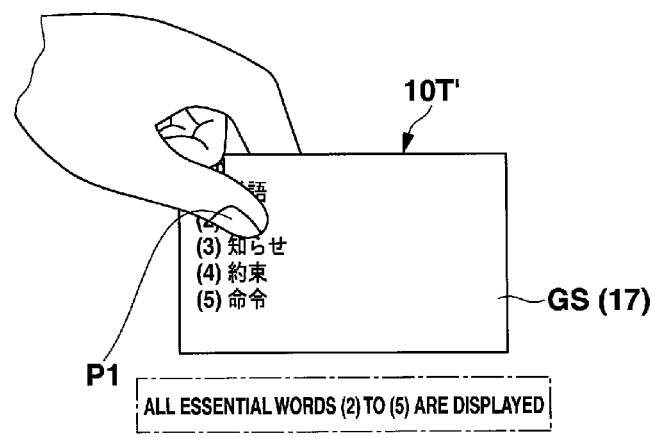
Figure 16A:
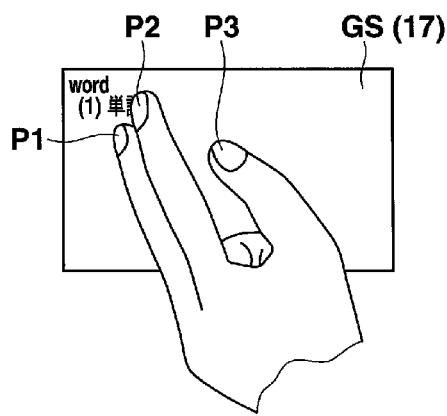
FIG. 16A to 16D are views showing a specific example of displaying operation on the explanation-information displaying screen in the information displaying process performed in the electronic dictionary apparatus.
Figure 16B:
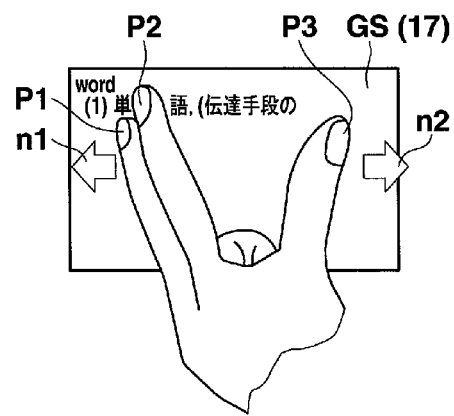
Figure 16C:
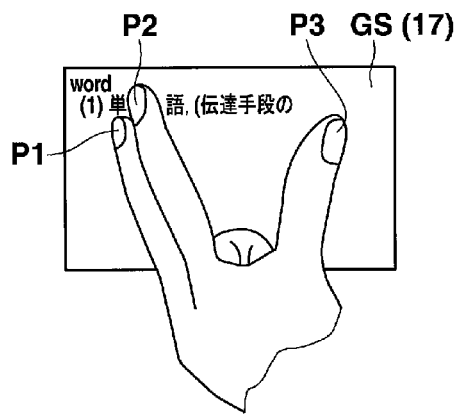
Figure 16D:
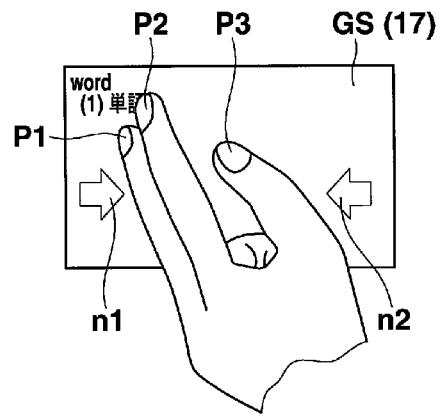

FIG. 15A and FIG. 15B are is views showing a specific example (No. 2) of another displaying operation by both hands on the explanation-information displaying screen GS in the information displaying process performed in the touch-panel PDA 10T'.

FIG. 15A is a view showing the explanation-information displaying screen GS of the touch-panel PDA 10T', on which the first word meaning "1 単 語" (1word) and the second word meaning "2 発言" (2statement) of the direction word "word" are displayed in the "essential word-meaning displaying mode". As shown in FIG. 15A, the user holds PDA 10T' with both hands, and touches the second word meaning "2 発言" (2statement) with the thumb P1 of the left hand and the lower portion to the second word meaning "2 発言" (2statement) with the thumb P2 of the right hand. Then, the user moves the thumb P2 of the right hand downward in the vertical direction (the direction across lines of the word meanings) as indicated by an arrow "m" shown in FIG. 15A.

Then, the third word meaning "3 知らせ" (3notice) to the fifth word meanings "5 命令" (5instruction) following the first word meaning "1 単語" (1word) and the second word meaning "2 発言" (2statement) are successively added and displayed in accordance with downward movement of the thumb P2 of the right hand, as shown in FIG. 15B.

In the above embodiments, the user touches the explanation-information displaying screen GS with the fingers at two touch positions t1, t2 and pinches out or pinches in after holding the fingers at the touch positions for a predetermined time to display detailed or simplified explanation information on the explanation-information displaying screen GS.

Meanwhile, the user pinches out or pinches in without holding the fingers at the touch positions for a predetermined time to display the character strings in the explanation information in enlarged or reduced-size characters on the explanation-information displaying screen GS.

Hereinafter, another operation for displaying the explanation information will be described with reference to FIG. 16A to FIG. 16D.

FIG. 16A to FIG. 16D are views showing a specific example of another displaying operation on the explanation-information displaying screen GS in the information displaying process performed in the electronic dictionary apparatus 10.

As shown in FIG. 16A to FIG. 16D, when the user pinches explanation information with three fingers P1, P2, P3 and pinches out or pinches in, then the explanation information is displayed as detailed or simplified information in accordance with the pinch-out or pinch-in operation. Meanwhile, when the user pinches the explanation information with two fingers P1, P2 and pinches out or pinches in, then character strings of the explanation information are enlarged or reduced in size and displayed in accordance with the pinch-out or pinch-in operation.

In the above description of the embodiments of the invention, the electronic dictionary has been described, which has the explanation information containing a direction word and plural word meanings of the direction word, but the present invention can be put into practice without a restriction to one direction word and limited word meanings. For example, a heading consisting of plural words is retrieved from a glossary database on the Internet, and the present invention can be effectively applied to the explanation information, which contains plural glossary items (word meanings in a broad sense) retrieved from such database.

The methods for performing the processes and the database used in the electronic dictionary apparatus 10 described in the above embodiments, that is, the information displaying process performed in accordance with the flow charts of FIG. 5A and FIG. 5B and the dictionary database 22b can be recorded and distributed as computer executable programs in external recording media 23 such as memory cards (ROM cards, RAM cards), Magnetic disks (floppy disks, hard disks), Optical disks (CD-ROMs, DVDs) and Semi-conductor memories. In an electronic apparatus provided with a computer and the touch-panel color displaying unit 17, the computer reads the program from the external recording medium 23 onto the memory 22 to run the program, thereby controlling the whole operation of the electronic apparatus and realizing the above mentioned information-display controlling function, including the function of performing the processes similar to the mentioned above and of displaying detailed or simplified explanation information depending on the user's multi-touch operation on the explanation-information displaying screen GS.

The program data for performing the above mentioned processes can be transferred in the format of program code through the network N. The electronic apparatus having a computer and the touch-panel color displaying unit 17 receives the program data through the communication unit 25, and the computer uses the program data to realize the function of displaying the detailed or simplified explanation information in response to the user's multi-touch operation on the explanation-information displaying screen GS.

In the description of the preferred embodiments of the invention, the dictionary-information displaying apparatus of the present invention has been described, taking a standalone electronic apparatus as an example, such as a mobile apparatus specialized in the electronic dictionary (electronic dictionary apparatus 10), the touch-panel PDA 10T, PC, mobile phone, electronic book and portable game-machine, which are provided with a dictionary function.

But another configuration can be employed for realizing the information-display controlling function of the electronic dictionary apparatus 10, that is, Web server (dictionary server) 31 is prepared on the network N, which server is provided with a direction-word retrieving function having the dictionary database 22b and the information-display controlling program 22a for retrieving a direction word, an explanation-information reading function for reading explanation information of the retrieved direction word, and an explanation-output controlling function for outputting detailed or simplified explanation information depending on the user's multi touch operation. Then, the user accesses the Web server 31, using a terminal device having the touch-panel color displaying unit 17 to make the Web server 31 display the explanation-information display screen GS of the retrieved word entered by the user, detecting the touch positions t1, t2 based on the user's operation on the explanation-information display screen GS and sending a detection information to the Web server, whereby the Web server displays detailed or simplified explanation information substantially in the same manner as described above.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:
1. An information displaying apparatus comprising:
a display with a touch panel; and
a processor configured to read explanation information corresponding to a direction word designated in response to an operation performed by a user on the touch panel and display the read explanation information on the display, the explanation information containing plural character strings,
wherein:
when the user touches the touch panel, the processor detects touched positions on the touch panel where the user has touched;
when the touched positions move, the processor performs a first judgment which judges whether a distance between the touched positions has become larger or shorter;
when it is determined by the first judgment that the distance between the touched positions has become shorter, the processor displays the explanation information on the display in a simplified manner with a specific character string of the explanation information displayed on the display and some character strings other than the specific character string removed;
the explanation information read by the processor comprises plural lines of word meanings which are displayed on the display;
the processor performs a second judgment which judges whether the touched positions on the touch panel have moved along one of the plural lines of word meanings displayed on the display so as to make the distance between the touched positions larger or shorter; and
depending on a result of the second judgment, the processor displays the explanation information in the one of the plural lines of word meanings on the display in a detailed manner or in a simplified manner.

2. The information displaying apparatus according to claim 1, wherein the processor annexes a marker to an arbitrary character string in the explanation information displayed on the display as the specific character string in response to the operation of the user.

3. The information displaying apparatus according to claim 2, wherein when the explanation information is displayed on the display in the simplified manner with the marker annexed character string displayed on the display and some character strings other than the marker annexed character string removed, and when it is determined that the distance between the touched positions has become shorter, the processor displays only the marker annexed character string on the display as the explanation information.

4. The information displaying apparatus according to claim 1, wherein:
the processor performs a third judgment which judges whether the touched positions on the touch panel have moved in a direction perpendicular to the plural lines of word meanings displayed on the display so as to make the distance between the touched positions larger or shorter; and
the processor displays the explanation information on the display with an additional line of word meanings or with a line of word meanings removed, depending on a result of the third judgment.

5. The information displaying apparatus according to claim 1, wherein:
the processor performs a third judgment which judges whether the touched positions have been held still for a predetermined amount of time;
when it is determined that the touched positions have been held still for the predetermined amount of time, the processor displays the explanation information on the display in a detailed manner or in the simplified manner, depending on a result of the first judgment; and
when it is determined that the touched positions have not been held still for the predetermined amount of time, the processor displays the explanation information enlarged or reduced in size on the display, depending on the result of the first judgment.

6. The information displaying apparatus according to claim 1, wherein:
the processor performs a third judgment which judges whether the touched positions on the touch panel have moved in a direction diagonal to the lines of the word meanings displayed on the display so as to make the distance between the touched positions larger or shorter; and
the processor displays the explanation information enlarged or reduced in size on the display, depending on a result of the third judgment.

7. The information displaying apparatus according to claim 1, further comprising a dictionary data storage which stores dictionary data, the dictionary data containing direction words and explanation information corresponding to the direction words;
wherein the processor reads from the dictionary data storage the explanation information corresponding to the direction word designated in response to the operation of the user and displays the read the explanation information on the display.

8. An information displaying method of controlling a computer in an electronic apparatus having a display with a touch panel, the method comprising:

reading explanation information corresponding to a direction word designated in response to an operation performed by a user on the touch panel, and displaying the explanation information on the display, the explanation information containing plural character strings, and the explanation information comprising plural lines of word meanings which are displayed on the display;

when the user touches the touch panel, detecting touched positions on the touch panel where the user has touched;

when the touched positions move, judging whether a distance between the touched positions has become larger or shorter and judging whether the touched positions have moved along one of the plural lines of word meanings displayed on the display so as to make the distance between the touched positions larger or shorter;

when it is determined that the distance between the touched positions has become shorter, displaying the explanation information on the display in a simplified manner with a specific character string of the explanation information displayed on the display and some character strings other than the specific character string removed; and when it is determined that the touched positions have moved along one of the plural lines of word meanings, displaying the explanation information in the one of the plural lines of word meanings on the display in a detailed manner or in a simplified manner.

9. A non-transitory computer-readable storage medium with a dictionary-information displaying program stored thereon, the dictionary-information displaying program causing a computer in an electronic apparatus having a display with a touch panel to perform functions comprising:

reading explanation information corresponding to a direction word designated in response to an operation performed by a user on the touch panel, and displaying the explanation information on the display, the explanation information containing plural character strings, and the explanation information comprising plural lines of word meanings which are displayed on the display;

when the user touches the touch panel, detecting touched positions on the touch panel where the user has touched;

when the touched positions move, judging whether a distance between the touched positions has become larger or shorter and judging whether the touched positions have moved along one of the plural lines of word meanings displayed on the display so as to make the distance between the touched positions larger or shorter;

when it is determined that the distance between the touched positions has become shorter, displaying the explanation information on the display in a simplified manner with a specific character string of the explanation information displayed on the display and some character strings other than the specific character string removed; and when it is determined that the touched positions have moved along one of the plural lines of word meanings, displaying the explanation information in the one of the plural lines of word meanings on the display in a detailed manner or in a simplified manner.

* * * * *